(12) United States Patent
Juliato et al.

(10) Patent No.: US 11,423,162 B2
(45) Date of Patent: Aug. 23, 2022

(54) SYSTEMS AND METHODS FOR MESSAGE ASSURANCE IN VEHICLE SYSTEMS

(71) Applicant: Intel Corporation, Sanata Clara, CA (US)

(72) Inventors: Marcio Juliato, Portland, OR (US); Shabbir Ahmed, Beaverton, OR (US); Maria Soledad Elli, Hillsboro, OR (US); Christopher Noe Gutierrez, Hillsboro, OR (US); Vuk Lesi, Cornelius, OR (US); Manoj R. Sastry, Portland, OR (US); John Charles Weast, Phoenix, AZ (US); Liuyang Lily Yang, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 209 days.

(21) Appl. No.: 16/833,200

(22) Filed: Mar. 27, 2020

(65) Prior Publication Data

US 2020/0226274 A1   Jul. 16, 2020

(51) Int. Cl.
G06F 21/62 (2013.01)
G06F 13/38 (2006.01)

(52) U.S. Cl.
CPC .............. *G06F 21/62* (2013.01); *G06F 13/38* (2013.01)

(58) Field of Classification Search
CPC ....... G06F 21/62; G06F 13/38; H04L 9/0819; H04L 9/0841; H04L 9/0894; B60W 50/02; B60W 2556/00; B60W 2050/0005
See application file for complete search history.

(56) References Cited

U.S. PATENT DOCUMENTS

| 10,623,386 B1* | 4/2020 | Bernat ................. H04L 63/061 |
| 10,688,963 B2* | 6/2020 | Hatton ................. B60R 25/209 |

(Continued)

FOREIGN PATENT DOCUMENTS

| WO | 2019030763 A1 | 2/2019 |
| WO | 2019227076 A1 | 11/2019 |

OTHER PUBLICATIONS

European Search Report issued for the European Patent Application No. 20204933.4, dated Apr. 12, 2021, 8 pages (for informational purposes only).

(Continued)

*Primary Examiner* — Joseph P Hirl
*Assistant Examiner* — Stephen T Gundry
(74) *Attorney, Agent, or Firm* — Viering, Jentschura & Partner mbB

(57) ABSTRACT

A vehicle control system, including an in-vehicle bus and a plurality of electronic control units (ECUs) coupled to the in-vehicle bus, wherein at least one ECU of the plurality of ECUs is configured to: receive, at a respective at least one ECU of the plurality of ECUs, a message in a message stream on the in-vehicle bus; evaluate the message to determine at least one of a confidence value of the security classification, a significance value of the message, or a bounds check value of the message; and determine in real-time to allow or deny the message to the vehicle control system based on at least one of the significance value of the message, the bounds check value of the message, or the confidence value of the security classification of the message, to provide a sanitized message stream to the vehicle control system.

19 Claims, 19 Drawing Sheets

(56) References Cited

U.S. PATENT DOCUMENTS

| | | | |
|---|---|---|---|
| 10,732,634 B2* | 8/2020 | Yang | G05D 1/0212 |
| 10,756,816 B1* | 8/2020 | Dreier | G06F 9/546 |
| 2013/0145482 A1* | 6/2013 | Ricci | B60R 21/01512 |
| | | | 726/28 |
| 2017/0013005 A1* | 1/2017 | Galula | H04L 63/20 |
| 2017/0295182 A1* | 10/2017 | Teshler | H04W 4/40 |
| 2018/0007076 A1* | 1/2018 | Galula | H04L 63/1425 |
| 2018/0109622 A1* | 4/2018 | Galula | H04L 67/12 |
| 2018/0196941 A1* | 7/2018 | Ruvio | H04W 12/122 |
| 2018/0241584 A1* | 8/2018 | Ruvio | G05B 19/0423 |
| 2019/0141069 A1* | 5/2019 | Pogorelik | H04L 63/1483 |
| 2020/0084292 A1* | 3/2020 | Markham | H04W 72/085 |
| 2020/0117534 A1* | 4/2020 | Yurzola | G06F 3/0619 |
| 2020/0166933 A1* | 5/2020 | Höfig | H04W 12/12 |
| 2020/0174671 A1* | 6/2020 | Margaglia | G06F 3/065 |
| 2020/0192603 A1* | 6/2020 | Tanriover | G06F 3/0659 |
| 2020/0218452 A1* | 7/2020 | Niven | G06F 3/0607 |
| 2021/0024079 A1* | 1/2021 | Jiao | G06Q 20/10 |
| 2021/0114606 A1* | 4/2021 | Alvarez | B60W 50/0205 |
| 2021/0203682 A1* | 7/2021 | Bajpai | H04L 67/12 |

OTHER PUBLICATIONS

Shalev-Shwartz et al., "On a Formal Model of Safe and Scalable Self-driving Cars," Cornell University arXiv e-prints, arXiv: 1708.06374, vols. 1-6, 1-191 (191 Pages) (2017-2018), https://arxiv.org/abs/1708.06374 (last visited Jun. 10, 2020). Individual volumes are identified as follows: vol. 1 = pp. 1-25; vol. 2 = pp. 26-55; vol. 3 = pp. 56-88; vol. 4 = pp. 89-121; vol. 5 = pp. 122-154; vol. 6 = pp. 155-191.

* cited by examiner

| Entry | Tag | Confidence | Significance | Bound Check | Decision | Rationale |
|---|---|---|---|---|---|---|
| 1 | M | HI | HI | Pass | ? | significance is high – requires caution |
| 2 | M | HI | HI | Fail | X | significance is high but bounds check failed |
| 3 | M | HI | LO | Pass | X | significance is low |
| 4 | M | HI | LO | Fail | X | significance is low |
| 5 | M | LO | HI | Pass | ? | significance is high – requires caution |
| 6 | M | LO | HI | Fail | ? | bounds check failed but significance is high – requires caution |
| 7 | M | LO | LO | Pass | X | malicious tag and significance is low |
| 8 | M | LO | LO | Fail | X | significance is low and bounds check failed |
| 9 | B | HI | HI | Pass | ✓ | confidence in benign tag is high and bounds check passed |
| 10 | B | HI | HI | Fail | ? | bounds check failed – requires caution |
| 11 | B | HI | LO | Pass | ✓ | confidence in benign tag is high and bounds check passed |
| 12 | B | HI | LO | Fail | ? | bounds check failed – requires caution |
| 13 | B | LO | HI | Pass | ? | significance is high – requires caution |
| 14 | B | LO | HI | Fail | ? | significance is high but bounds check failed – requires caution |
| 15 | B | LO | LO | Pass | ✓ | significance is low |
| 16 | B | LO | LO | Fail | ? | confidence in benign tag is low and bounds check failed – requires caution |

610

| Entry | Tag | Confidence | Significance | | Decision | Rationale |
|---|---|---|---|---|---|---|
| | | | Instant | Trend | | |
| 5 | M | LO | HI | ↑ | ? | significance increasing – requires caution |
| 5 | M | LO | HI | ↓ | X | significance decreasing |
| 13 | B | LO | HI | ↑ | ? | significance increasing – requires caution |
| 13 | B | LO | HI | ↓ | X | significance decreasing |

| Entry | Tag | Confidence | Significance | Decision | Rationale |
|---|---|---|---|---|---|
| 1 | M | HI | HI | ? | significance is high – requires caution |
| 2 | M | HI | LO | ✗ | significance is low |
| 3 | M | LO | HI | ? | significance is high – requires caution |
| 4 | M | LO | LO | ✗ | significance is low |
| 5 | B | HI | HI | ✓ | confidence in benign tag is high |
| 6 | B | HI | LO | ✓ | confidence in benign tag is high |
| 7 | B | LO | HI | ? | significance is high – requires caution |
| 8 | B | LO | LO | ✗ | significance is low |

630

| Entry | Tag | Confidence | Significance | | Decision | Rationale |
|---|---|---|---|---|---|---|
| | | | Instant | Trend | | |
| 3 | M | LO | HI | ← | ? | significance increasing – requires caution |
| 3 | M | LO | HI | → | ✗ | significance decreasing |
| 7 | B | LO | HI | ← | ? | significance increasing – requires caution |
| 7 | B | LO | HI | → | ✗ | significance decreasing |

| Entry | Tag | Confidence | Significance Decision | Rationale |
|---|---|---|---|---|
| 1 | M | HI | ✗ | high confidence malicious |
| 2 | M | LO | ? | low confidence malicious – requires caution |
| 3 | B | HI | ✓ | high confidence benign |
| 4 | B | LO | ? | low confidence benign – requires caution |

| Entry | Tag | Bound Check | Significance Decision | Rationale |
|---|---|---|---|---|
| 1 | M | PASS | ? | bounds check passed but malicious – requires caution |
| 2 | M | FAIL | ✗ | malicious and bounds check failed |
| 3 | B | PASS | ✓ | benign and bounds check passed |
| 4 | B | FAIL | ? | benign but bounds check failed – requires caution |

FIG. 6D

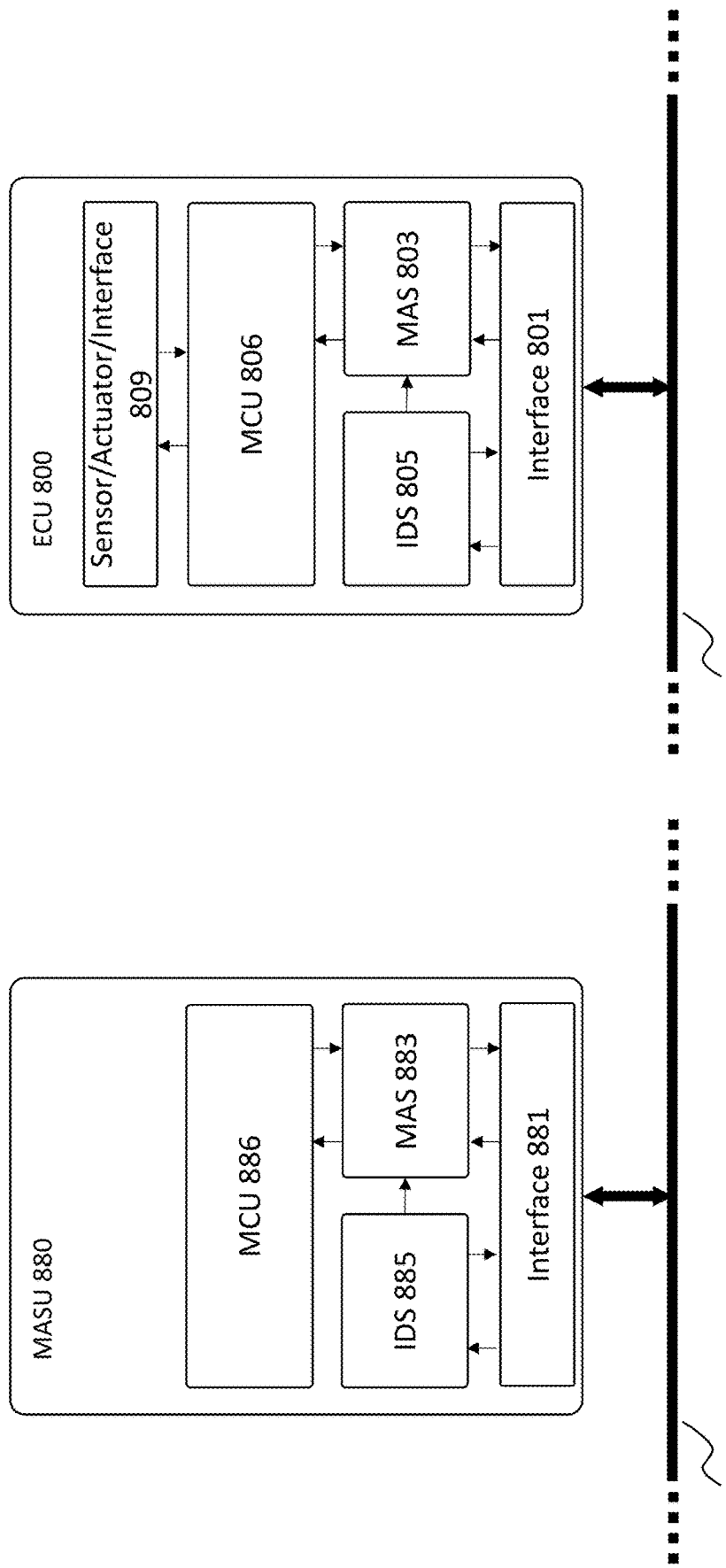

SYSTEMS AND METHODS FOR MESSAGE ASSURANCE IN VEHICLE SYSTEMS

TECHNICAL FIELD

Various aspects of this disclosure generally relate to vehicle control systems, and more particularly, to systems and methods for assuring secure and safe communications over an in-vehicle network (IVN) of a vehicle control system.

BACKGROUND

Automated vehicles utilize reliable vehicle control and safety systems that process data acquired at a vehicle. By using data acquired at the vehicle, which may include data about the vehicle's environment or data about the vehicle itself, the vehicle may alter its movements, modify its positioning with respect to external elements, and/or respond to newly detected events. The vehicle control and safety systems include various controller units, actuator units, and sensor units distributed throughout the vehicle. The various components communicate data with each other over an in-vehicle network (IVN).

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings.

FIGS. 6A-6D show the corresponding decision trees in table representation for the decision module of FIGS. 5A-5D, respectively.

FIG. 8A shows an exemplary dedicated centralized IDS/MAS node for a VCS according to various aspects of the present disclosure. FIG. 8B shows an exemplary distributed IDS/MAS node for a VCS according to various aspects of the present disclosure.

DESCRIPTION

Figure 1:
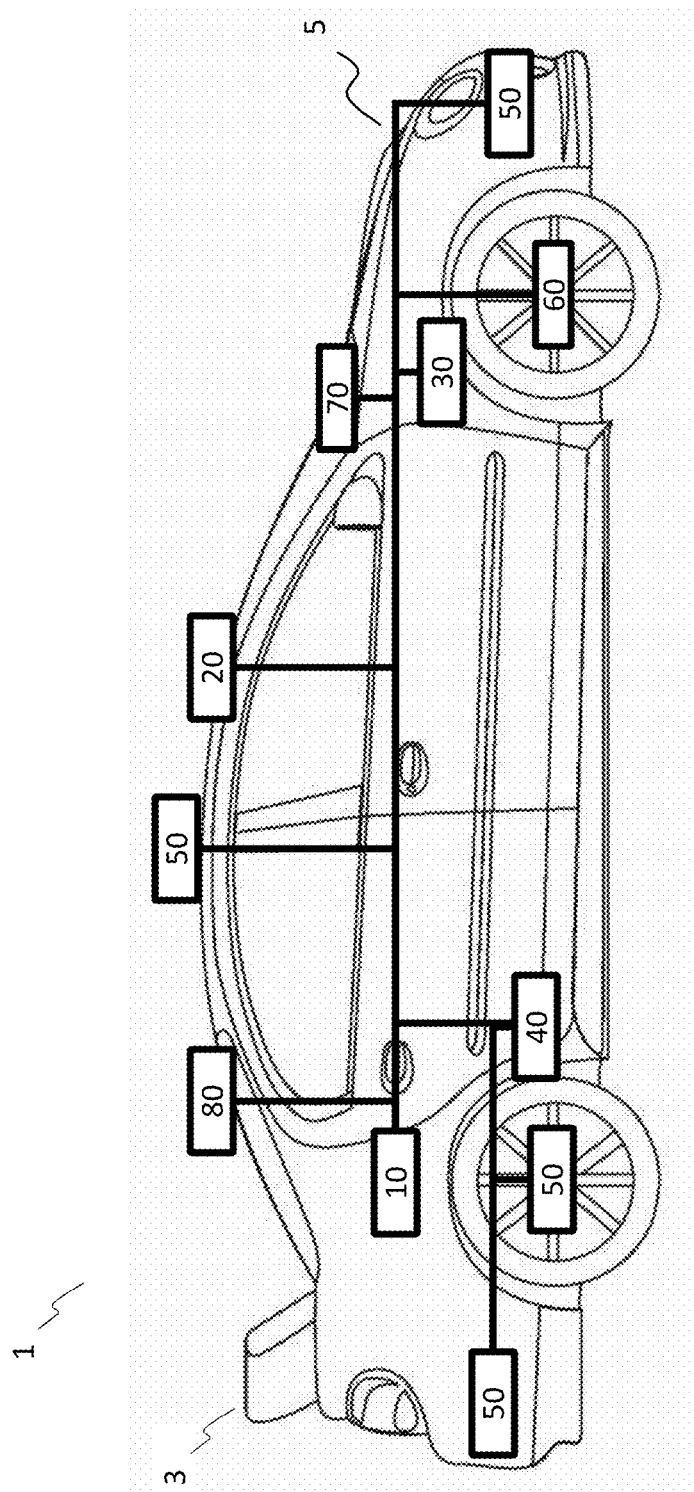
FIG. 1 shows an exemplary vehicle control system for an automated vehicle in accordance with various aspects of the present disclosure.

The following detailed description refers to the accompanying drawings that show, by way of illustration, exemplary details and aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The phrases "group (of)", "set (of)", "collection (of)", "series (of)", "sequence (of)", "grouping (of)", etc., and the like in the description and in the claims, if any, refer to a quantity equal to or greater than one, i.e., one or more. The phrases "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group including the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit detailed herein may be realized as two (or more) separate entities with equivalent functionality, among others.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven or drivable object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, a flying taxi, an unmanned aerial vehicle, and the like.

A "ground vehicle" may be understood to include any type of vehicle, as described above, which is configured to traverse or be driven on the ground, e.g., on a street, on a road, on a track, on one or more rails, off-road, etc. An "aerial vehicle" may be understood to be any type of vehicle, as described above, which is capable of being maneuvered above the ground for any duration of time, e.g., a drone. Similar to a ground vehicle having wheels, belts, etc., for providing mobility on terrain, an "aerial vehicle" may have one or more propellers, wings, fans, among others, for providing the ability to maneuver in the air. An "aquatic vehicle" may be understood to be any type of vehicle, as described above, which is capable of maneuvers on or below the surface of liquid, e.g., a boat on the surface of water or a submarine below the surface. It is appreciated that some vehicles may be configured to operate as one or more of a ground, an aerial, and/or an aquatic vehicle.

The term "automated vehicle" may describe a vehicle capable of implementing at least one navigational change without any occupant or manual input. A navigational change may describe or include a change in one or more of steering, braking, or acceleration/deceleration of the vehicle. A vehicle may be described as automated even in case the vehicle is not fully automatic (e.g., fully operational with occupant or without occupant input). Automated vehicles may include those vehicles that can operate under driver control during certain time periods and without driver control during other time periods. Automated vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Automated vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Automated vehicles may also include vehicles that control one or more aspects of vehicle navigation under certain circumstances, such as under certain environmental conditions (e.g., spatial areas, roadway conditions). In some aspects, automated vehicles may handle some or all aspects of braking, speed control, velocity control, and/or steering of the vehicle. An automated vehicle may include those vehicles that can operate without a driver. The level of automation of a vehicle may be described or determined in accordance with the levels of automation identified by the Society of Automotive Engineers (SAE) (e.g., as defined by the SAE, for example in SAE J3016 2018: Taxonomy and definitions for terms related to driving automation systems for on road motor vehicles) or by other relevant professional organizations. The SAE defined levels of automation may have a value ranging from a minimum level, e.g. level 0 (illustratively, substantially no driving automation), to a maximum level, e.g. level 5 (illustratively, full driving automation).

The term "ego vehicle" may be used to specify the vehicle that is the observer of all other actors, similar to how the driver of a vehicle observes all other traffic participants. From the perspective of the ego vehicle, all other traffic participants (vehicles, pedestrians, and so on) are the observed actors, or targets. Ego vehicle coordinates are centered and oriented with reference to the ego vehicle.

In the context of the present disclosure, "vehicle operation data" may be understood to describe any type of feature related to the operation of a vehicle. By way of example, "vehicle operation data" may describe the status of the vehicle such as the type of propulsion unit(s), types of tires or propellers of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include dynamic features that change during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time-varying features or data).

Throughout the present disclosure, the following terms may be used as synonyms: safety driving model, driving parameter set, driving model parameter set, safety layer parameter set, driver assistance, automated driving model parameter set, and/or the like (e.g., driving safety parameter set). These terms may correspond to groups of values, including various parameters and thresholds, used to implement one or more models for directing a vehicle to operate according to the manners described herein.

The vehicle control systems of many modern vehicles include numerous different electronic control units (ECUs) disposed in various parts of the vehicle. An ECU may be an embedded system in a vehicle that controls one or more electrical systems or subsystems in the vehicle. For instance, an automated vehicle may include an engine control module (ECM), a transmission control module (TCM), a steering control module (SCM), a brake control module (BCM), a global positioning system (GPS) module (GPSM), a vision control module (VCM), a heading control module (HCM), an in-vehicle infotainment unit (IVIU), etc. Some ECUs are fundamentally important for safety, e.g., steering ECU, braking ECU, airbag ECU. The ECUs may be connected to an in-vehicle network (IVN) that allows the ECUs to communicate with each other, so that one ECU may use data obtained from another ECU. The in-vehicle network may include one or more buses. The ECUs may be interconnected with one or more buses. IVNs can employ a heterogeneous set of buses.

An ECU may include at least one processor and at least one memory with software that executes on the at least one processor to cause that ECU to perform the desired operations. Such at least one processor and at least one memory may be referred to as a microcontroller unit (MCU), and such software may be referred to as firmware.

An attacker may be able to load malicious software ("malware") into an ECU. The malware may cause the ECU to perform malicious operations and can compromise vehicle, road, and passenger safety.

A vehicle control system requires data and signals to be reliably communicated among the ECUs from one or more of the in-vehicle networks. The safety and security of an automated vehicle can be severely affected by attacks launched against ECUs and against the IVN. One attack vector is to compromise an ECU with malware that causes the ECU to masquerade as a different ECU in the IVN. An ECU compromised by spoofing or masquerading attacks may disguise communications from an unknown source as being from a known, trusted source to affect safety. In this kind of attack, an adversary may inject messages into the in-vehicle network on behalf of an authentic ECU.

For example, an ECU (e.g., any ECU on the IVN) could be compromised and become a rogue ECU masquerading as a speedometer. For example, the malware may cause the rogue ECU to intercept and resend messages to make it seem to have originated at the speedometer, and those messages may include malicious data, such as incorrect velocity information of the vehicle. Vehicle control systems rely on information about the vehicle's speed received from the IVN to perform safety-critical functions such as collision warnings, emergency braking, etc. By compromising this information or signal, an attacker can adversely impact main safety features that are the underlying foundation to ensure road and passenger safety.

For another example, ECUs with external connectivity may be targeted and compromised via a remote attack. For instance, an in-vehicle infotainment unit, IVIU, may have external connectivity (e.g., Wi-Fi or cellular) and internal connectivity (e.g., IVN). Malware installed in an IVIU via the external connectivity may cause the IVIU to masquerade as the vision control module, VCM, on the IVN. In particular, the malware may cause the IVIU to send messages that seem to have originated at the VCM, and those messages may include malicious data, such as incorrect information about whether the vehicle is within a desired lane, thereby causing the vehicle to veer off of the road.

For another example, ECUs may also be compromised by a direct attack on the IVN. For instance, a device may be plugged directly into the IVN (e.g., via a port of an on-board diagnostics system of a vehicle, such as an OBDII port) and be recognized as one of the ECUs of the vehicle control system. Such a device may be used to launch a masquerade attack or replay attack.

Intrusion detection techniques, while helpful to detect attacks, often present false positive/negative rates that can allow attackers to impact safety. In particular, intrusion detection techniques provide a good level of assurance of the integrity of in-vehicle network (IVN) messages. However, malicious messages may be injected with a sufficiently high frequency so as to exploit false negatives to evade intrusion detection. Thus, by mounting such an attack, adversaries can maximize their impact against the system.

Attackers may also employ replay attacks which delay, replay, or repeat valid messages to misdirect a receiving ECU into believing a rogue ECU is an authentic ECU. Replay attacks end up being similar to injection attacks from an IDS perspective. Such an attack can also exploit false positive and false negatives of an IDS through a high frequency of replay or repetition. A high frequency injection is how an attacker would maximize the changes of being successful. Though most of the malicious traffic would be intercepted by the IDS, a fraction of it would be misclassified. The small percentage of malicious traffic that slips through can still cause harm. Consequently, it is desirable to introduce additional assurance layers that reduce effects of false negatives, while not incurring overheads prohibitive for real-time execution.

FIG. 1 is a block diagram of an exemplary vehicle control system 1 for an automated vehicle 3. Referring to FIG. 1, vehicle control system (VCS) 1 includes various ECUs that communicate with each other via an in-vehicle network or bus 5 to control the movement and/or operation of the automated vehicle 3. For purposes of this disclosure, an ECU in a VCS may be referred to as a node. For purposes of illustration, VCS 1 is shown as a control system for a ground vehicle. Referring to FIG. 1, the nodes in VCS 1 may include a central ECU 10, a vision control module (VCM) 20, steering control module (SCM) 30, a transmission control module (TCM) 40, various sensor modules 50, a brake control module (BCM) 60, an in-vehicle infotainment unit (IVIU) 70, and a global positioning system (GPS) module (GPSM) 80. The various sensor modules 50 may include a LIDAR sensor, ultrasonic sensors, and speedometers. While automated vehicle 3 is depicted as a ground vehicle, aspects of this disclosure may be equally or analogously applied to aerial vehicles such as drones or aquatic vehicles such as boats. Furthermore, the quantities and locations of ECUs, as well as relational distances (as discussed above, the figures are not to scale) are provided as examples and are not limited thereto. The ECUs of automated vehicle 3 may be arranged around a vehicular housing, mounted on or outside of the vehicular housing, enclosed within the vehicular housing, or any other arrangement relative to the vehicular housing where the ECUs move with automated vehicle 3 as it travels. The vehicular housing, such as an automobile body, drone body, plane or helicopter fuselage, boat hull, or similar type of vehicular body dependent on the type of vehicle.

The in-vehicle network 5 may include one or more of the following networks or buses: Controller Area Network (CAN bus), CAN-FD, FlexRay bus, MOST network, Local Interconnect Network (LIN bus), Bluetooth bus, Wi-Fi, cellular, and automotive Ethernet. For example, an automotive CAN bus system can allow ECUs to communicate with each other without complex dedicated wiring. A message communicated on the in-vehicle network by the nodes may be structured in a frame or packet according to a predefined format. The message may include an identification field, a control field, and a data field.

The identification field in each message includes a message identifier (message ID) that identifies a message type and/or a source node of the respective message. For example, in a CAN bus system, each message ID is associated with only one node. However, a single node may use different message IDs for different types of messages. However, a node is not supposed to use any message ID that is associated with any other node. Other buses or networks may allow different associations of message identifiers and nodes.

The data field in each message includes content or payload that includes data information acquired at the source node and communicated to other nodes. The data information may include sensor measurements, data samples, operational status, control commands, etc.

Referring to FIG. 1, the in-vehicle network or bus 5 may be a controller area network (CAN) bus. Messages may be communicated based on the CAN bus extended frame format, with the message ID situated at or very near the beginning of the frame. As indicated above, the message ID is a fundamental piece of information that is supposed to identify the source of the message. In other words, the message ID is supposed to indicate which node the message "belongs to." The message ID may also identify the message type.

Figure 2:
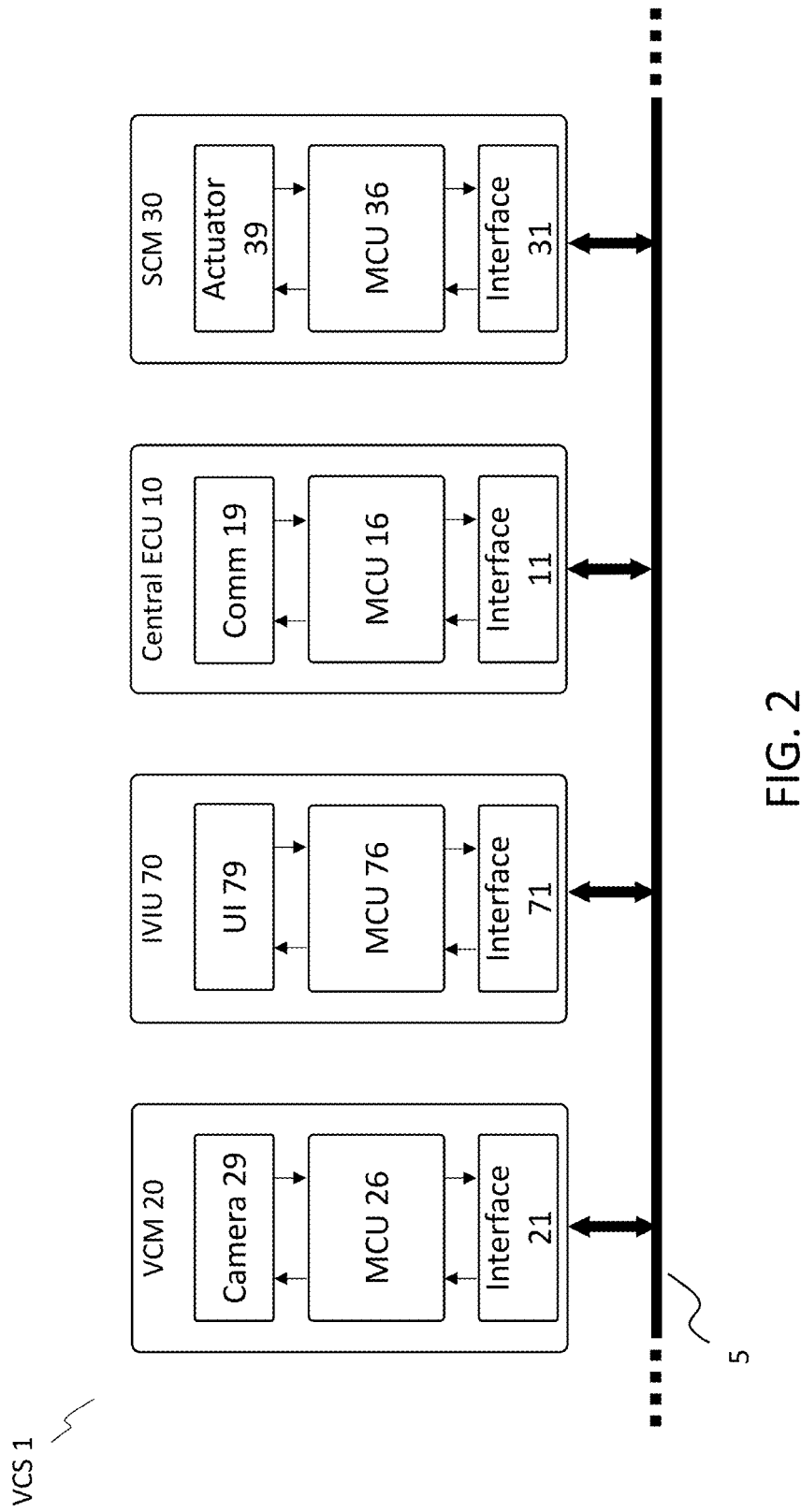
FIG. 2 shows various exemplary electronic control units of a vehicle control system of FIG. 1 in accordance with various aspects of the present disclosure.

FIG. 2 is a block diagram of the vehicle control system of FIG. 1, with additional details for certain nodes. FIG. 2 is a block diagram of VCS 1, with additional details for central ECU 10, VCM 20, SCM 30, and IVIU 70. For purposes of clarity and brevity, not all nodes of VCS 1 are shown and not all of the nodes shown are described in detail. However, most ECUs may operate substantially as described below with regard to VCM 20.

Referring to FIG. 2, VCM 20 includes an MCU 26 (which includes firmware 28), a camera 29, and an interface 21.

MCU 26 is responsible for running firmware 28 to operate the camera 29, to process image data acquired by the camera 29, to generate information based on the processed image data, and to communicate the generated information. The generated information may include information about the position of other agents, the position of road surface markings/indications, traffic signals, the speed of the ego vehicle, etc.

The camera 29 may be configured to monitor the vehicle's surroundings (roads, vehicles, pedestrians, etc.) and recognize and read traffic lights and traffic signs. For example, MCU 26 may process the image data acquired by camera 29 to generate voxel maps detailing the environment surrounding of the ego vehicle. MCU 26 may use data provided by other ECUs to generate voxel maps and perform image recognition.

VCM 20 may include a bus controller that receives outgoing data from MCU 26, creates frames, sends frames as digital data, arbitrates bus conflicts, detects errors, etc. The bus controller (not shown) may be implemented as part of the same chip or package as MCU 26 or as a distinct, stand-alone chip or package, external to the MCU chip or package. The bus controller may be a CAN controller responsible for the entire CAN protocol.

In particular, a CAN bus system achieves high levels of reliability with a single pair of differential signals, referred to as CAN high (CANH) and CAN low (CANL). Each node connected to a CAN bus has an associated set of unique message identifiers, i.e., each message identifier is exclusive to a node and does not overlap with any other nodes. The message identifier may also be used to identify the type of message received (e.g., to acquire the signals carried by the payload of the message) and to resolve bus arbitration.

In a CAN bus system, each node is only supposed to use one of its own message identifiers when generating messages. So at a receiving node, it may be difficult or impossible to determine which node actually sent a given message. Due to the absence of a built-in authentication mechanism, a compromised node may send a message with any message identifier to the bus. Consequently, malicious messages may be sent by any compromised node. In the case of vehicles, compromised ECUs may masquerade as other critical systems, such as the ECUs responsible for braking, acceleration and steering. However, nodes with a message assurance system according to the present disclosure may fully address such vulnerabilities.

If the in-vehicle network is an analog-based bus, interface 21 may be a transceiver responsible for converting the digital data received from the bus controller to the analog levels of the physical channel. Interface 21 also reads the bus and feeds that information back to the bus controller, to enable the bus controller to perform operations such as arbitration and error checking.

The MCUs, bus controllers, and interfaces in the other nodes operate similarly. However, instead of a camera 29, an MCU may be connected to a sensor, actuator, or another communications device. For example, in other nodes, the MCU may be responsible for operating a sensor (e.g., LIDAR, radar, ultrasonic, odometry, velocity, acceleration, gyroscopic etc. sensors), actuator (e.g., gearbox, throttle, steering, brakes, etc.), or a communications interface (e.g., cellular, WiFi, another in-vehicle bus, user interface). With reference to FIG. 2, SCM 30 includes an MCU 36 that operates an actuator 39 configured to steer the automated vehicle, IVIU 70 includes an MCU 76 that operates an interface configured to receive passenger input and/or display a status of the automated vehicle, and central ECU 10 includes an MCU 16 that operates a communications interface 19 (e.g., an external celulral communications) configured to transmit and/or receive environmental traffic information (e.g., V2X communications).

Sensors may include any number of data acquisition devices and components depending on the requirements of a particular application. This may include: image acquisition devices, proximity detectors, acoustic sensors, infrared sensors, piezoelectric sensors, etc., for providing data about the vehicle's environment. Image acquisition devices may include cameras (e.g., standard cameras, digital cameras, video cameras, single-lens reflex cameras, infrared cameras, stereo cameras, etc.), charge coupling devices (CCDs) or any type of image sensor. Proximity detectors may include radar sensors, light detection and ranging (LIDAR) sensors, mmWave radar sensors, etc. Acoustic sensors may include: microphones, sonar sensors, ultrasonic sensors, etc. Accordingly, each ECU having a sensor may be configured to observe a particular type of data of the automated vehicle's environment and may forward the data to a central ECU 10 in order to provide the vehicle with an accurate portrayal of the vehicle's environment.

Sensors may include measurement devices for measuring vehicle-state parameters, such as a velocity sensor (e.g., a speedometer) for measuring a velocity of the automated vehicle, one or more accelerometers (either single axis or multi-axis) for measuring accelerations of the automated vehicle along one or more axes, a gyroscope for measuring orientation and/or angular velocity, odometers, altimeters, thermometers, etc.

Actuators may include components of an automated vehicle related to steering and movement. In ground vehicles, actuators may include an engine, a transmission, brakes, a steering wheel, etc. In aerial vehicles, actuators may include one or more of rotors, propellers, jet engines, wings, rudders or wing flaps, air brakes, a yoke or cyclic, etc. In aquatic or sub-aquatic vehicles, actuators may include any one or more of rudders, engines, propellers, a steering wheel, etc.

Communication devices may include one or more radio frequency (RF) transceivers to facilitate mobility coordination with other nearby vehicular communication devices and/or central networking components that perform decisions and/or computations related to automated driving. Communication devices may also include position devices for determining a position of the automated vehicle. For example, this may include global position system (GPS) or other global navigation satellite system (GNSS) circuitry configured to receive signals from a satellite system and determine a position of the automated vehicle.

At least one ECU (e.g., central ECU 10) of VCS 1 may also include software that operates a safety driving model to implement an ADAS/AV system. Alternatively, a plurality of ECUs may include software to cooperatively operate a safety driving model to implement an ADAS/AV system.

Figure 3A:
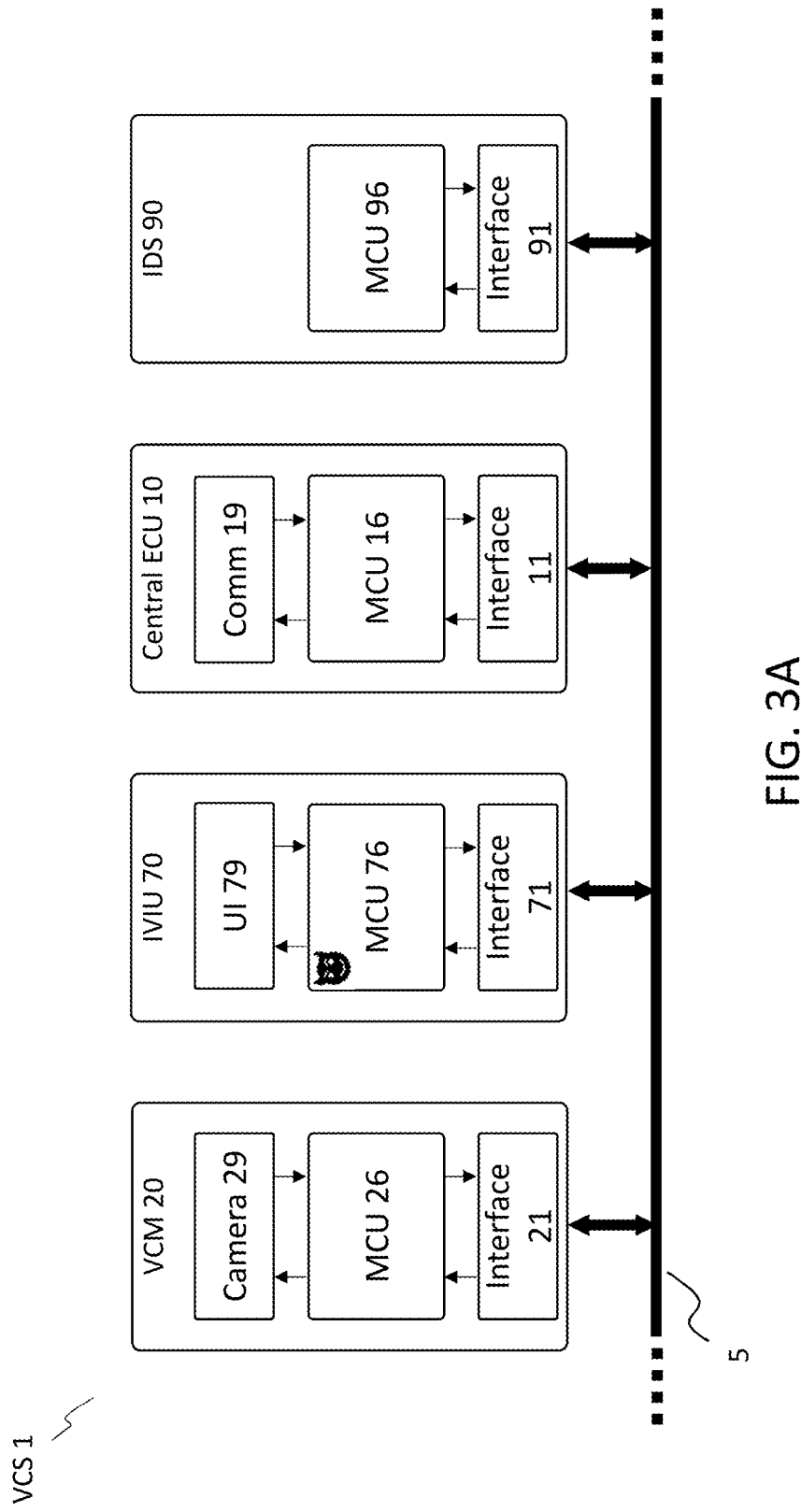
FIG. 3A shows various exemplary electronic control units (ECUs) of a vehicle control system connected to an in-vehicle network, including a single dedicated intrusion detection node according to some aspects of the present disclosure.

FIG. 3A shows an exemplary vehicle control system 1 with various ECUs connected to an in-vehicle network 5, including an ECU 90 serving as a dedicated intrusion detection system (IDS). More specifically, FIG. 3 illustrates a compromised vehicle control system 1 including (among others) a rogue node, e.g., IVIU 70, alongside authentic nodes, e.g., central ECU 10, VCM 20, and IDS 90. For example, IVIU 70 may be infected with malware and be under adverse control. The rogue node may be used to spread false information in the in-vehicle network 5. The rogue node may be able to perform a masquerading attack (i.e., send messages on behalf of other nodes) or a replay attack. Consequently, by injecting messages with the corresponding falsified message ID (e.g., masquerading messages), the rogue node can cause propagation and consumption of false information in the automated driving/piloting system, affecting safety-critical decision making (e.g., by delaying the FCW—Forward Collision Warning). The rogue node may impersonate an authentic node and transmit messages including false information.

FIG. 3A also illustrates a centralized dedicated intrusion detection system (IDS) unit interfacing the in-vehicle network (IVN) to monitor the message traffic stream. An intrusion detection system detects that a possible intrusion has happened and may block or flag the suspected message. For example, the IDS may inspect (all or selected) traffic in the IVN and provide security classifications for the inspected traffic (e.g., flag each message that seems malicious as malicious and/or flag each message that seems benign as bengin) according to a certain policy. The IDS can inspect different traffic properties (timing of messages, frequency of messages, etc), physical properties (e.g. voltages), message identifiers, payload, etc to make a decision. For instance, a centralized dedicated IDS coupled to the IVN may inspect the messages in the IVN and output security tags (malicious/benign) corresponding to each inspected message. The security tags may be provided via a secure communication channel between the centralized IDS and another node (e.g., the central ECU 10). The security tags may be provided via the IVN as another message. In some instances, the ECUs coupled to the IVN may receive and quarantine a message until a security tag associated with the message is also received. The ECUs can determine whether to consume (e.g., use the content of) a message based on the security tag associated with the message. In other instances, a centralized dedicated IDS coupled to the IVN may inspect the messages in the IVN and filter out or remove messages deemed to be malicious by the IDS. The ECUs coupled to IVN can expect that the messages in the IVN are sanitized.

Referring to FIG. 3A, IDS 90 may be a dedicated ECU that continually monitors the in-vehicle network 5 of the vehicle control system 1 to detect a masquerading message or a replayed message that is being injected by a malicious node. For example, IDS 90 may include bus interface 91 and MCU 96 including control logic in hardware or software. The IDS control logic may read all or a selected subset of messages from the traffic stream on the in-vehicle network. The IDS control logic may differentiate between messages that are transmitted by authentic nodes and messages that are transmitted by rogue nodes. Consequently, the IDS control logic may detect a malicious message (e.g., masquerading/replayed message) and mark the malicious message or remove it from the in-vehicle network 5. In some examples, a centralized IDS may be implemented in the central ECU 10.

Alternatively, the intrusion detection system may be decentralized. For example, an IDS module may be included in each node, in which case, the IDS module of a node may inspect a selected subset of messages from the traffic stream on the IVN. The selected subset of messages may be messages for the respective node or allegedly sourced by the respective node. When a malicious message (e.g., masquerading/replayed message) is detected, the IDS module can block the malicious message from being consumed by the respective node. The detection techniques for a decentralized IDS are the same as or similar to the detection techniques for a centralized IDS. Additionally, the respective node may also detect that a message allegedly sourced by the respective node is a malicious message sourced by a malicious node because the respective node does not recognize the message as one that the respective node has transmitted. When a malicious message is detected at one node, the IDS of the one node can also send a security tag corresponding to the message to indicate to an IDS of another node that the message is malicious. In some instances, when a malicious message is detected at one node, the IDS of the one node may remove the malicious message from the traffic stream.

Figure 3B:
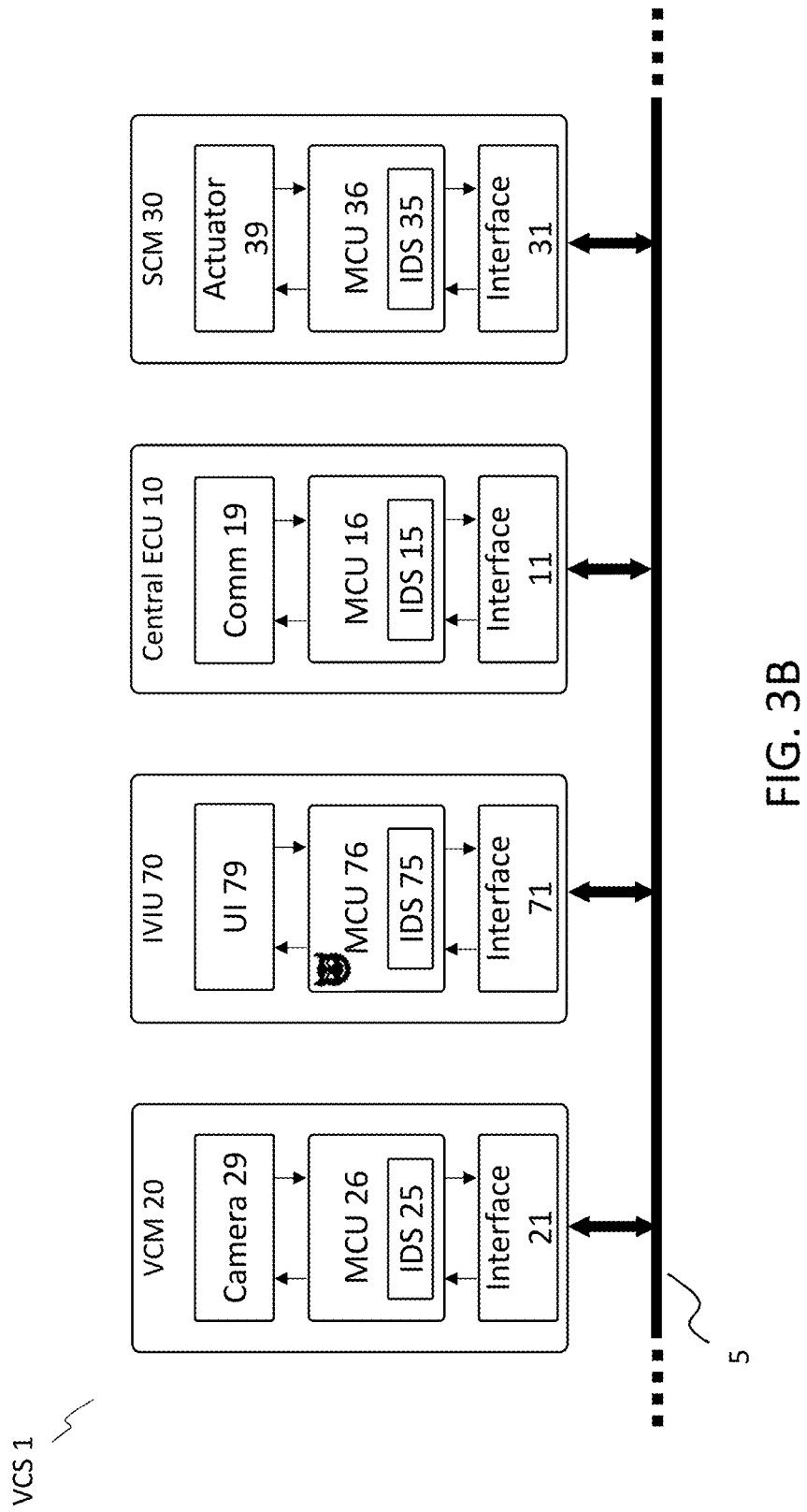
FIG. 3B shows various electronic control units (ECUs) of a vehicle control system connected to an in-vehicle network, where each ECU includes an intrusion detection system (IDS) module according to some aspects of the present disclosure.

For example, FIG. 3B shows an exemplary vehicle control system 1 with various ECUs connected to an in-vehicle network 5, where each node includes an intrusion detection system (IDS) module interfacing the in-vehicle network (IVN) to monitor the message traffic stream. Referring to FIG. 3B, each ECU may include an IDS module that continually monitors the in-vehicle network of the vehicle control system to detect a malicious message (e.g., masquerading/replayed message) that is being injected by a malicious node. For example, central ECU 10 may include an internal bus interface 11, an external interface 19 (e.g., Wi-Fi, cellular), and MCU 16 with IDS 15 including control logic in hardware or software. In a decentralized IDS, for example, the IDS control logic may be firmware implemented in the MCU of each node or the IDS control logic may be a circuit connected to the interface and MCU of each node. The IDS control logic may be implemented as part of the same chip or package as the MCU or as a distinct, stand-alone chip or package, external to the MCU chip or package.

Referring to FIG. 3B, the IDS control logic enables a monitoring node to detect a new message, determine a characteristic of the message (e.g., by extracting or obtaining the message identifier, the message content, the message timing message, and the like), and to determine whether the message is false based on the characteristic. The IDS control logic may inspect all messages or a selected subset of messages on an in-vehicle network (IVN), perform a security or threat assessment of each inspected message, and assign a security or threat classification label (e.g., a security or detection tag indicating a security/threat assessment) to each inspected message. For example, the IDS control logic may classify a message as either benign or malicious (i.e., binary detection tags). The IDS control logic may provide the security classification label (security/detection tag) for each message. That is, the IDS control logic may provide a per-message payload tagging that designates whether the IDS control logic deems the message authentic or inauthentic (e.g., either a benign designation or malicious designation), indicating whether the received message is believed to have arrived from the legitimate transmitting node which is normally expected to send this message or indicating whether the received message is believed to have arrived from a rogue node. Where the IDS control logic is associated with a specific node, the IDS control logic may inspect each message but only perform a security or threat assessment, assign a tag, and output a tag for messages to be received by the specific node. The IDS control logic may be implemented with various intrusion detection techniques, including, e.g., ECU voltage fingerprinting, Message Time Series IDS, Control Loop IDS, etc.

Figure 4:
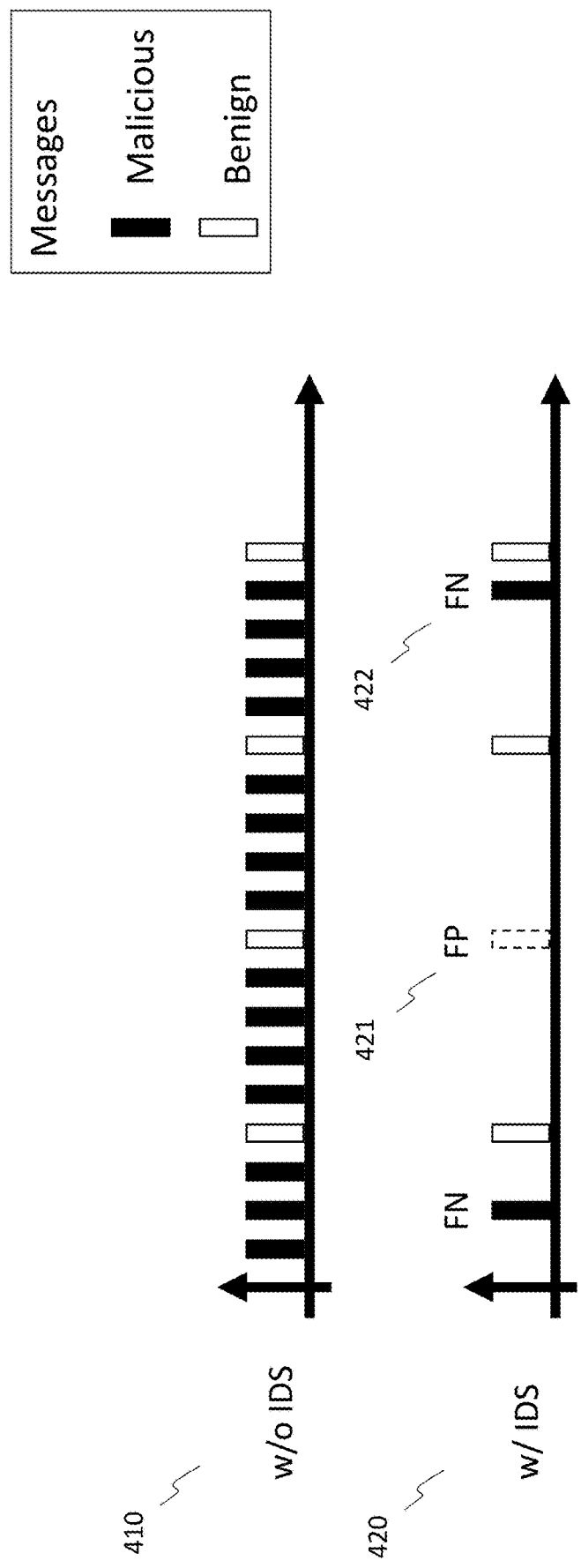
FIG. 4 illustrates example timelines of a high frequency injection attack with and without an intrusion detection system according to various aspects of the present disclosure.

FIG. 4 illustrates example timelines of a high frequency injection attack with and without an intrusion detection system. Referring to 410, the timeline shows a large number of malicious messages interspersed among benign messages. Referring to 420, the timeline shows that when intrusion detection techniques are applied, most of the malicious messages can be filtered out. However, intrinsic false positive/negative rates of IDSs can cause some malicious messages to pass through unnoticed, i.e. false negatives 422, while some benign transmissions are falsely tagged as malicious, i.e., false positives 421. Accordingly, an attacker seeking to maximize damage can maximize the frequency at which false messages may be injected in order to exploit the false negative rate of the intrusion detection system.

Automated driving or piloting systems, e.g., AV and ADAS systems, of an ego vehicle may use a formal safety model or established parametrized framework to facilitate safe decision making by the ego vehicle. Mathematical equations and logical rules allow an ego vehicle to calculate minimum safe distances from the ego vehicle to other agents (vehicles, pedestrians, etc.) for various driving contexts. A Dangerous Situation is a state or context where the ego vehicle has exceeded the minimum safe distances to other agents either by its own actions or the actions of others. The Danger Threshold is the moment just before entering a Dangerous Situation and is the time at which an appropriate or proper response should be performed to avoid the ego vehicle entering into a Dangerous Situation. The formulas and rules defined by the safety model/framework require knowledge of the ego vehicle's own speed as well as longitudinal and lateral acceleration capabilities and limitations (e.g. what is the ego vehicle's maximum acceleration and braking deceleration) and location and velocity of the other agents around the ego vehicle, as well as the acceleration/deceleration parameters of the other agents. The reliability of these parameters received via the in-vehicle network (IVN) is crucial for the safety model/framework to function properly. As a result, any falsified parameter could result in an incorrect calculation and a violation of the safety model which could lead to a collision.

Successful attacks in vehicle control systems can be very dangerous. Such attacks may affect critical ECUs such as the ones responsible for steering, braking, accelerating, and overall sensing. For instance, a compromised ECU may masquerade as an ECU that is fundamental for the lateral control of the vehicle, thereby injecting malicious position and heading information that causes the vehicle to veer off of the road. In another instance, a compromised ECU may masquerade as an ECU that is fundamental for the longitudinal control of the vehicle, thereby injecting malicious position and speed information that causes the vehicle to collide in a front-end collision.

An additional message assurance system or control logic based on the formal safety model or parameterized framework may operate in conjunction with the IDS control logic to further sanitize the message traffic stream and provide additional security. An exemplary security and safety-based message assurance system or control logic may verify the content of a message or other metadata associated with a message is within a predetermined norm based on a security and/or safety model/framework. The secondary verification may be based on one or more of the following three aspects: (1) a safety bounds check used to filter out any message including data information that is non-compliant or non-conforming (e.g., a value in the data field violates or is consistent with the safety model and/or dynamic control constraints), (2) a confidence score (security aspect) which indicates the level of certainty of the authenticity determination of the incoming message traffic (e.g., how certain the system is with regards to the authenticity of the incoming message traffic), and (3) a significance measure (safety aspect) which indicates the level of importance of the incoming message (e.g., how important the current measurement contained in the incoming message is, given the vehicle's closeness to the safety envelope (e.g., parameters or threshold values associated with safety model boundary conditions), relative to the vehicle's positioning with regards to the safety model).

Figure 5A:
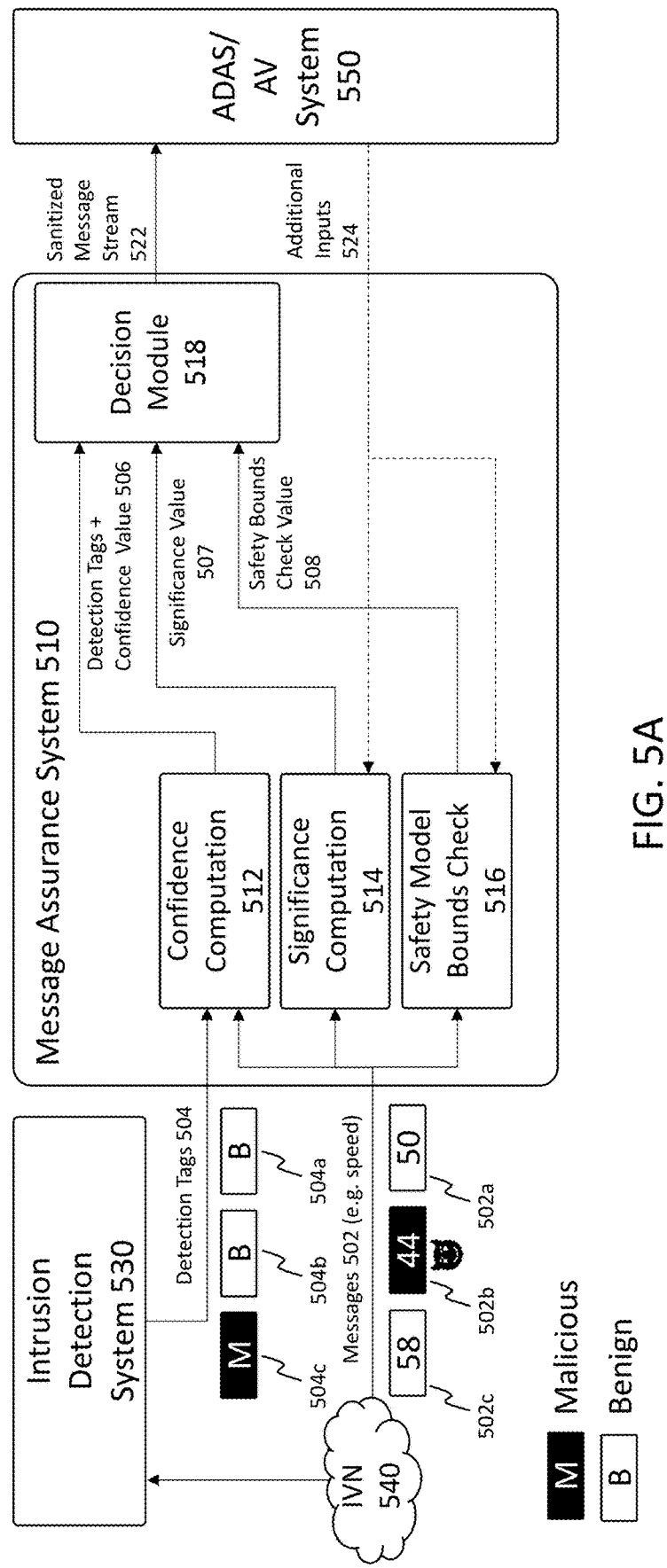
FIGS. 5A-5D are block diagrams showing exemplary message assurance systems according to various aspects of the present disclosure.

FIGS. 5A-5D are block diagrams showing exemplary message assurance system control logic according to various aspects of the present disclosure. Referring to FIG. 5A, various exemplary modules of a security and safety-based message assurance system control logic (MAS) 510 are shown. The message assurance system 510 may include a safety model bounds check module 516, a significance computation model 514, a confidence computation module 512, and a decision module 518. The control logic of the message assurance system 510 may be implemented on at least one MCU. Each of the safety model bounds check module 516, the significance computation model 514, and the confidence computation module 512 may receive a stream of messages 502, inspect all or a subset of the messages 502, and provide a real-time assessment value (e.g., confidence value 506, significance value 507, safety bounds check value 508) to the decision module 518. The decision module 518 is configured to perform a real-time determination of whether the message should be allowed to remain on or removed from the sanitized message stream 522. The ADAS/AV system 550 may receive the sanitized message stream 522 and provide updated security and/or safety information to the significance computation module 514 and/or the safety model bounds check module 516 based on the content or payload of the clean messages. For example, the ADAS/AV system 550 may be a higher level control logic of the vehicle control system 1 that uses the sanitized messages to control an automated vehicle. The ADAS/AV system may be implemented on a dedicated controller unit (e.g. MCU 16 of central ECU 10) or may be implemented on the respective MCUs of a plurality of ECUs.

A message assurance system or IDS may perform a neutralization technique to remove malicious messages from the IVN. An example of a neutralization technique for a real-time message inspection approach is described in a commonly assigned co-pending patent application, U.S. patent application Ser. No. 16/026,413, "Systems And Methods For Neutralizing Masquerading Attacks In Vehicle Control Systems", which is incorporated by reference in its entirety herein.

The message assurance system 510 may receive from the in-vehicle network 540 messages 502 and receive from the intrusion detection system 530 detection tags 504 associated with each of the received messages 502. IDS 530 may monitor all messages or a subset of messages 502 on the in-vehicle network 540 and assign to each message 502 a detection tag 504. For example, IDS 530 may include IDS control logic for assessing the security of each message and may provide the detection tags over a secure communication link. Referring to an exemplary message traffic stream of FIG. 5, the IDS may receive messages 502 including information about the speed of the ego vehicle. In the exemplary message stream, message 502a is authentic, message 502b is disguised, and message 502c is authentic. IDS 530 may determine that message 502a is benign and provide a detection tag 504a corresponding to message 502a indicating a benign security assessment to MAS 510. In a false negative case, IDS 530 may determine that message 504b is benign even though the message is falsified and provide a detection tag 504b corresponding to message 502b indicating a benign security assessment to MAS 510. In a false positive case, IDS 530 may determine that message 504c is malicious even though the message is authentic and provide a detection tag 504c corresponding to message 502c indicating a malicious security assessment to MAS 510.

The safety bounds check module 516 performs a safety-based message characterization. The safety model bounds check module 516 enforces conformance with an adopted formal safety model, and the associated rules and constraints imposed by the safety model. The safety model bounds check module 516 may inspect the content or payload (e.g., a data sample or sensor measurement value) of a message 502 and determine whether or not the content or payload is in compliance with the safety model. For examples, the associated rules may include expectations for the behaviour of the vehicle, such as speed progression as a consequence of maximum braking and maximum acceleration. The safety model bounds check module 516 may inspect the payload or content of a message and output a safety bounds check value 508 corresponding to the payload or content. The safety bounds check value 508 may be a binary decision (e.g., a tag of 0 (no violation tag) or 1 (violation tag)) that indicates whether or not the message payload is in accordance with expectations. The safety bounds check value module 516 may also output a safety bounds check value 508 that is a conformity value corresponding to how off of the expectation the message payload is (e.g, a quantitative measure or magnitude of the discrepancy between the value of the message payload and the expected value or range of expected values). The expected value or range of expected values may be determined based on the progression of previously received message values and/or threshold values determined based on the safety driving model. The determined safety bounds check value 508 of the safety model bounds check module is provided to the decision module 518.

The confidence computation module 512 performs a security-based message characterization. The confidence computation module 512 may operate in conjunction with an intrusion detection system or be part of the intrusion detection system. The confidence computation module may receive as input a message 502 from the in-vehicle network and a detection tag 504 associated with the message. The confidence computation module may further determine a confidence value 506 indicating a level of confidence in the security classification indicated in the detection tag. For example, the confidence value may indicate a strong confidence of a malicious tag. A confidence value 506 may be determined based on intrusion detection techniques, e.g., ECU voltage fingerprinting, Message Time Series IDS, Control Loop IDS, etc. The confidence computation module may provide the confidence value to the decision module 518.

The significance computation module 514 performs a safety-based message characterization. The significant computation module 514 may determine an urgency or importance of consuming the content or payload of the message based on context. The significance computation module 514 may determine a significance value 507 that aims to quantify how important it is to use or obtain a fresh or up-to-date measurement at any given point in time, under a current safety circumstance or situation classification. For instance, a safety model may define a minimum safety distance from the ego vehicle to the vehicle in front to avoid a rear-end collision. Alternatively, for example, a minimum distance larger than the minimum safety distance may be received as input from the user/passenger/driver/operator. In connection with a minimum distance threshold, an unsafe action such as suddenly accelerating when vehicles are in close proximity could cause the actual distance to be reduced so as to effect a change in the situation classification into a dangerous situation. According to a safety driving model, a minimum safety distance may be context dependent and change dynamically based on driving conditions. For example, a minimum safety distance may increase at higher speeds to account for longer braking distances and provide additional response time. Accordingly, the closer the distance between the ego vehicle and the vehicle in front of the ego vehicle is to the current minimum safety distance (i.e., a boundary case), the higher the significance value of the speed measurement because the speed measurement may trigger a change in the situation classification or a safety violation based on the safety driving model. The significance computation module may provide the significance value to the decision module 518. The significance value may be proportional to the likelihood of a change in the current driving situation classification changing or a violation of the rule associated with the current driving situation. The likelihood of a change may be determined based on a difference in magnitude between a value (e.g., separation distance) affected by the content of the message (e.g., speed measurement) and a boundary threshold value (e.g. minimum safety distance for a current driving situation).

Speed information has been given as an example, but other types of information signals transmitted on in-vehicle networks such as longitudinal/lateral control messages, Object Data list (ODL), world models, are other examples of crucial information that requires protection. For example, one or more ECUs (e.g., steering module, acceleration module, braking module, collision avoidance module, parking assist module) may provide longitudinal/lateral control information. For example, one or more ECUs (e.g., camera system, LIDAR system, V2X communications system) may provide ODL and/or world model information about one or more objects near the ego vehicle. The information provided may indicate the presence of one or more objects in the vicinity of the ego vehicle. The information provided may include identification information indicating the type of each object (e.g., light pole, pedestrian, another vehicle, etc.), location information indicating the position of each object (e.g., a real world location based on a world model or a relational location relative to the ego vehicle), or tracking information indicating anticipated motion of each object (e.g., stationary or estimated/projected trajectory). The type of object and/or anticipated behavior of the object may also be significant.

The following sections describe these three components in more detail.

The safety model bounds check module 516 may be based on a subset of assumptions that define a safety model and the expected behaviour of the vehicle. For example, the safety model may be based on an assumption that various distances between the ego vehicle and other traffic participants must be maintained in order to guarantee safe driving. The various distances between vehicles may include a minimum longitudinal distance (e.g., a distance between the ego vehicle and a vehicle in front of the ego vehicle) and a minimum lateral distance (e.g., a distance between the ego vehicle and a vehicle on a side of the ego vehicle). The minimum longitudinal distance and minimum lateral distance may dynamically change based on the velocity of the vehicles, minimum/maximum accelerations/decelerations, and road conditions. The values of the minimum longitudinal distance and the minimum lateral distance may be determined by various predetermined formulas and/or constraints of the safety driving model for various driving contexts.

For another example, the safety driving model may be based on an assumption that various acceleration/deceleration, speed, and/or separation distance requirements during different navigating maneuvers must be maintained in order to guarantee safe driving. For example, the various acceleration and speed requirements may include minimum and maximum accelerations/decelerations and speeds for various maneuvers (e.g., turns, lane change, etc.). The minimum and maximum accelerations/decelerations, speeds, and distances may dynamically change based traffic and road conditions. The values of the minimum and maximum accelerations/decelerations, speeds, and/or distances may be determined by various predetermined formulas and/or constraints of the safety driving model.

At a node, received in-vehicle network messages non-conforming to or non-compliant with the formulas and/or constraints defined by the formal safety model should be discarded as the messages would pose a safety violation from the perspective of the safety model and indicate a security threat. For example, the content or payload may include, but are not limited to, acceleration, braking/deceleration, steering, and other actuation related messages. For example, a message would be non-conforming if the message included acceleration information that exceeded a defined limitation on acceleration. A message may also be considered non-conforming if an action taken by the ego vehicle based on the information contained in the message would cause the ego vehicle to violate the safety driving model.

The safety bounds check module 516 may include determining whether a currently received measurement value is consistent with previously received measurement values (e.g., progression of measurement values) or with a predetermined expected value. If there is a substantial discrepancy, e.g., if a difference between a currently received measurement value and an expected value is greater than a threshold, the currently received measurement value may be considerer anomalous or suspicious.

To gain noise immunity and prevent frequent blocking of benign messages, the value of a message content may be indirectly compared. An average value or fitted value based on a sequence of message content may be determined. The sequence of message content may include the current message content and previously obtained message content (i.e., a history of message content). For example, to prevent chattering when acceleration/braking values are close to thresholds (e.g., maximum acceleration) defined by a safety driving model, a direct derivative (i.e., difference between consecutive velocities) should not be used. Rather, the slope over a window of n previously obtained measurements using a regression model is computed.

A sliding window of n speed measurements may be buffered in memory, and once the safety model check is invoked (at the arrival of a new message), the slope and intercept of the linear regression line y=kx+m can be computed as:

$$k = \frac{\sum y \sum x^2 - \sum x \sum xy}{n \sum x^2 - (\sum x)^2}, m = \frac{n \sum xy - \sum x \sum y}{n \sum x^2 - (\sum x)^2}. \quad \text{(Eq. 1)}$$

As the absolute speed range is not of interest for purposes of this acceleration bounds safety check, only the rate of change need be computed. The slope k may be computed and compared to the maximum acceleration/deceleration bounds as defined in safety model. If the slope is within bounds, the most recent speed measurement is accepted; otherwise, the message should be discarded.

Similarly, when acceleration is near a threshold defined by the safety driving model, an averaging or regression analysis of a current and previous speed measurements may be performed. A slope corresponding to a acceleration may be computed and compared to the maximum and minimum acceleration bounds as defined by the safety driving model for a particular driving context, where the maximum/minimum acceleration bounds may be different based on a driving situation and may dynamically change.

The safety bounds check module 516 provides a bounds check value or score. The bounds check value or score may be a continuous value of a numeric range. The bounds check value may also be scaled or normalized. For example, the bound check value may be scaled and in the range [0,1], where a bounds check value closer to 0 indicates no violation, while a bounds check value closer to 1 indicates a substantial violation. In some examples, the bounds check value or score may be binary, i.e., substantial violation (e.g., 1, FAIL) or no/insubstantial violation (e.g., 0, PASS). In some examples, the bounds check value may be proportional to a magnitude of the discrepancy between the currently received measurement value and an expected value, where the expected value may be a value or range of values determined based on a progression of previously received measurement values.

A confidence value may be determined based on the message content or metadata associated with the message. For example, a confidence value may be determined based on message arrival times. IDS control logic may detect anomalous messages based on differences between arrival times. For example, the IDS control logic may determine and store the arrival time of incoming messages on the in-vehicle network and may use the arrival times information to determine a message interval period between messages. The message interval periods of several previously received messages may be averaged to determine an expected arrival time of the next message. The average may be a arithmetic or geometric average. The determined message interval period and expected arrival time may be used to detect anomalous messages. For example, the IDS control logic may tag a current message as malicious when the arrival time of the current message is substantially different from an expected arrival time, otherwise it may be tagged as benign. The threshold value used for determining whether there is a substantial difference between the arrival time and the expected arrival time may be determined by the safety model. The confidence computation module may further use the difference of the arrival time of the current message and the expected arrival time of the message to determine a confidence value or score. The smaller the difference the stronger the confidence associated with a benign tag, and conversely, the weaker the confidence associated with a malicious tag. For example, a confidence value may be determined by:

$$\frac{\text{arrival time of the current message} - \text{expected arrival time}}{\text{message interval period}},$$

for messages tagged as malicious, and $$\frac{\text{message interval period} - \left( \begin{array}{c} \text{arrival time of the current message} - \\ \text{expected arrival time} \end{array} \right)}{\text{message interval period}},$$

for messages tagged as benign.

By this determination, when a message is benign, the smaller the difference between the arrival time of the current message and the expected arrival time of the message, the closer the confidence value approaches 1 (i.e., strong confidence). When a message is malicious, the smaller the difference between the arrival time of the current message and the expected arrival time of the message, the closer the confidence value approaches 0 (i.e., weak confidence).

In other examples, a confidence value may be determined based on the message content. IDS control logic may detect anomalous messages based on a comparison between the message content value to a predetermined range or threshold value. However, due to jitter, a message content value may temporarily be outside the predetermined range or exceed a predetermined threshold value. The confidence computation module may assign a confidence value to account for or mitigate violations due to jitter. For example, when the difference between the message content value and the predetermined range or threshold value is small, the message is tagged as malicious but the tag may be associated with a lower confidence value. However, when the difference between the message content value and the predetermined range or threshold value is large, the message is tagged as malicious and the tag may be associated with a high confidence value. For example, a confidence value may be determined by:

$$\frac{\text{message content value} - \text{expected value}}{\text{range of expected values}},$$

for messages tagged as malicious, and $$\frac{\text{range of expected values} - (\text{message content value} - \text{expected value})}{\text{range of expected values}},$$

for messages tagged as benign.

By this determination, when a message is benign, the smaller the difference between the message content value and the expected value, the closer the confidence value approaches 1 (i.e., strong confidence). When a message is malicious, the smaller the difference between the message content value and the expected value, the closer the confidence value approaches 0 (i.e., weak confidence). For example, when the security classification of the message is malicious, the confidence value may be proportional to the magnitude of the difference, and when the security classification of the message is benign, the confidence value may be inversely proportional the magnitude of the difference.

Alternatively, the confidence computation module 512 may receive confidence values or scores provided by the intrusion detection system 530. The IDS control logic may output a tag corresponding to the classification of each message intercepted and processed by the IDS. A message may be classified as either benign or malicious. In addition, the IDS control logic may provide a confidence value or score that indicates how certain the IDS is in the classification. In this case, the confidence computation module 512 may be subsumed into the intrusion detection system 530.

The confidence value or score of a security classification or detection tag may be scaled or normalized and may assume any continuous value of a specific numeric range. For example, the numeric range may be between [0,1], where a confidence value closer to 0 indicates a weaker confidence in the classification, while a confidence value closer to 1 indicates a stronger confidence. In some examples, the intrusion detection classification confidence value or score may be binary, i.e., strong confidence (e.g., 1) or no/low confidence (e.g., 0).

The significance computation module 514 may receive messages, each received message may include content or payload corresponding to sample data of a series of sample data from a sensor and/or monitor. The significance computation module may determine a significance of each sample data and provide a significance value or score. The sample significance value or score quantifies the significance of a current sample from the perspective of safety. The significance of a particular sample may be contextual or context based, e.g., the significance of sample data may depend on the driving situation. As the significance of a sample data is contextual, the significance value of each sample data of a sequential series of sample data may be stored for comparison or for determining a trend.

For example, the safety driving model may be predicated in part on an assumption where maintaining a safe longitudinal distance to the preceding vehicle is a safety-critical task. To determine whether the ego vehicle may be violating or in danger of violating the longitudinal safety distance defined by the safety model, the automated driving system may need to know the current speed of the ego vehicle. In this example, the significance of a current speed measurement data sample may depend on a relationship between a current separation distance between the ego vehicle and the preceding vehicle and the current minimum longitudinal safety distance. The minimum longitudinal safety distance as defined by the safety model may change based on the current speed of the ego vehicle. To determine whether the current speed measurement is significant (e.g., safety-critical), the significance computation module may determine that the current separation distance between the ego vehicle and the leading vehicle is much greater than the minimum longitudinal safety distance defined by the safety driving model (for the current ego vehicle speed) for the current driving situation, and therefore assigns a low significance value to the current speed measurement data sample because the current speed measurement is not safety-critical. On the other hand, the significance computation module may determine that the current separation distance to the preceding vehicle either violates or is at the danger threshold (as defined by the safety model) of violating the minimum longitudinal safety distance (for the current ego vehicle speed), and assigns a high significance value to the current speed data because applying an updated velocity measurement is crucial to determine on which side of the safety bound the ego vehicle currently resides. The higher the significance value, the more likely the sample data may be consumed.

For this example, a sample significance σ of the current speed measurement data can be formulated as follows:

$$\sigma = 1 - \frac{d - d_{min}}{d}, \quad\quad (\text{Eq. 2})$$

where d is the current actual distance from the ego vehicle to the preceding vehicle, and $d_{min}$ is the smallest allowable distance to the preceding vehicle (for the current ego vehicle speed), i.e., the minimum longitudinal safety distance associated with the current speed of the ego vehicle as per the safety model. An approximate distance d can securely be obtained from a Trusted Computing Base (TCB) of the automated driving control system, and this measurement may originally be constructed from a sensing channel independent of the in-vehicle network (e.g., through image processing or independently corroborated measurement values).

The distance measurement d may be noisy and unreliable (e.g., due to weather conditions or objects appearing and disappearing). To account for the lack of accuracy and/or lack of precision, the shortest allowable distance may be computed using a time gap as a buffer. For example, $d_{min}$ in Eq. 2 may be replaced by $d_{min}^{time\ gap}$, which is defined as follows:

$$d_{min}^{time\ gap} = d_{min}^{default} + \tilde{v}_r \cdot T_{gap}, \quad\quad (\text{Eq. 3})$$

where $d_{min}^{default}$ is the default minimum distance which is always to be maintained, i.e., the absolute minimum longitudinal safety distance for any speed of the ego vehicle as per the safety model (e.g., several meters), $T_{gap}$ is the desired distance from the ego vehicle to the preceding vehicle expressed as time, and $\tilde{v}_r$ is the current ego vehicle speed. The time gap based minimum distance can be observed as the minimum required distance allowing the emergency braking system to be effective at the current speed of the ego vehicle.

For purposes of computing the significance of the current speed measurement data sample based on $d_{min}^{time\ gap}$, $\tilde{v}_r$ in Eq. 3 must not be extracted exclusively from the ego vehicle speed $v_r$ reported on the in-vehicle network from the speed sensor, since this would allow the attacker to directly influence the significance measure σ. Significance computation related to a data sample has to rely on information available via other channels rather than the source of the data sample, e.g., a corroborating measurement determined by a different subsystem. Specifically, the other channels may include current speed measurements which are obtained from the vision system of the ego vehicle, i.e., determining an estimated or inferred speed measurement based on image processing and provided by the automated driving system or vehicle control system of the ego vehicle.

The safety model may provide the values for $d_{min}$ or $d_{min}^{default}$. For example, the safety model may define $d_{min}^{default}$ as two meters. In some examples, an additional parameter, $T_{gap}$, may be provide as a user/driver/pilot/passenger setting. For example, a driver/pilot/user/passenger may set $T_{gap}$ as two or three seconds. $T_{gap}$ may be complementary setting to a safety model, to allow the flexibility of establishing an absolute minimum time-distance buffer independently of ($d_{min}$-default) based on extra input provided by the driver/user/operator.

It should be noted that although the above example is described with respect to a minimum longitudinal safety distance, the approach not limited thereto. The approach can easily be adapted to other safety criteria (e.g., minimum lateral safety distance).

The significance value or score of a data sample or measurement value may be a continuous value of a numeric range. The sample significance value may also be scaled or normalized. For example, the sample significance value may be scaled and in the range [0,1]), where a significance value closer to 0 indicates a lower significance, while a significance value closer to 1 indicates a higher significance. In some examples, the sample significance value or score may be binary, i.e., strong significance (e.g., 1, closer to threshold value) or no/low significance (e.g., 0, further from threshold value). The significance value may be based on a difference in magnitude between the content of the message (or a value derived from the content of the message) and a threshold value associated with the current driving context. The significance value may be inversely proportional to the difference in magnitude.

In general, a vehicle control system should provide alternate means (e.g., different backup calculation) to ascertain or determine safety-critical or security-critical data. The redundancy is important in case an adversary attacks a particular sensor. The additional redundant information may serve as corroborating information or be used to facilitate discarding of a message to sanitize the message stream. For example, if an accelerometer is under attack, acceleration and deceleration information may be interpolated from previously received velocity information.

Figure 5B:
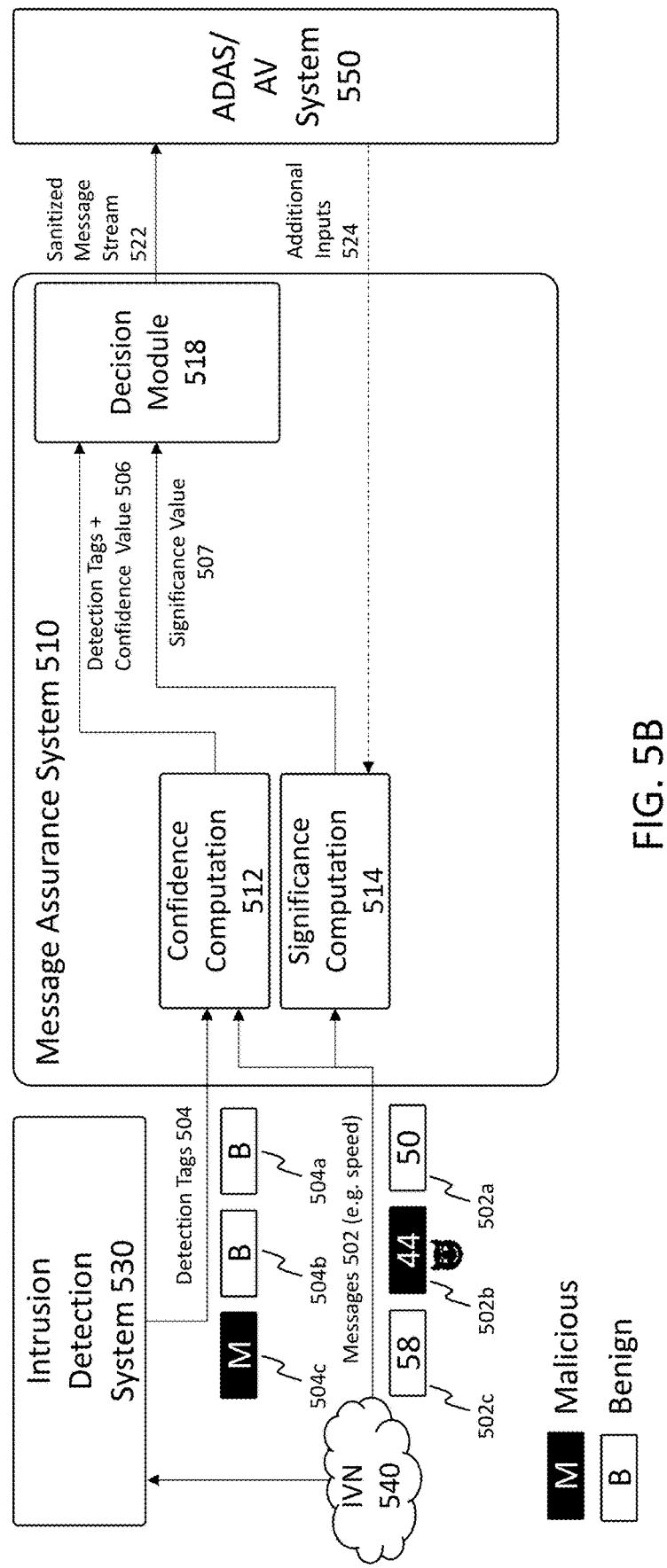
Figure 5C:
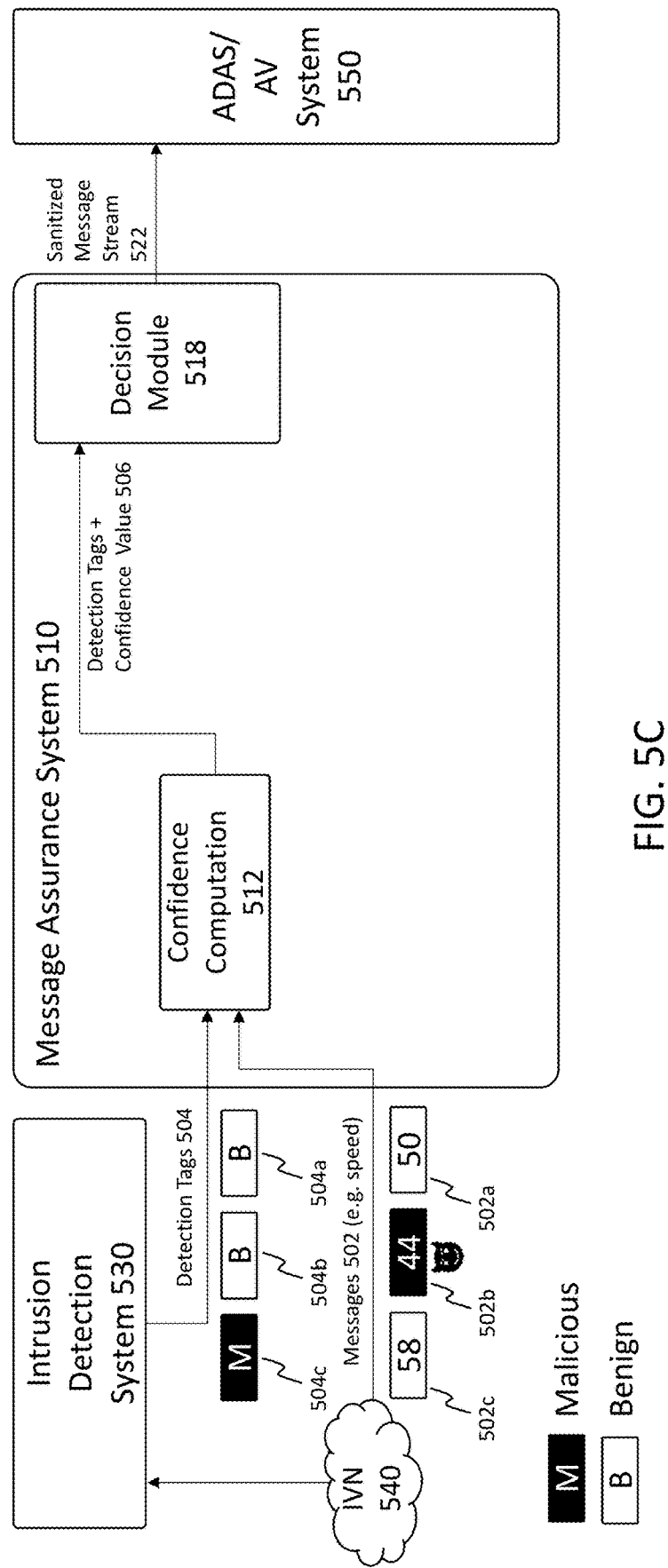
Figure 5D:
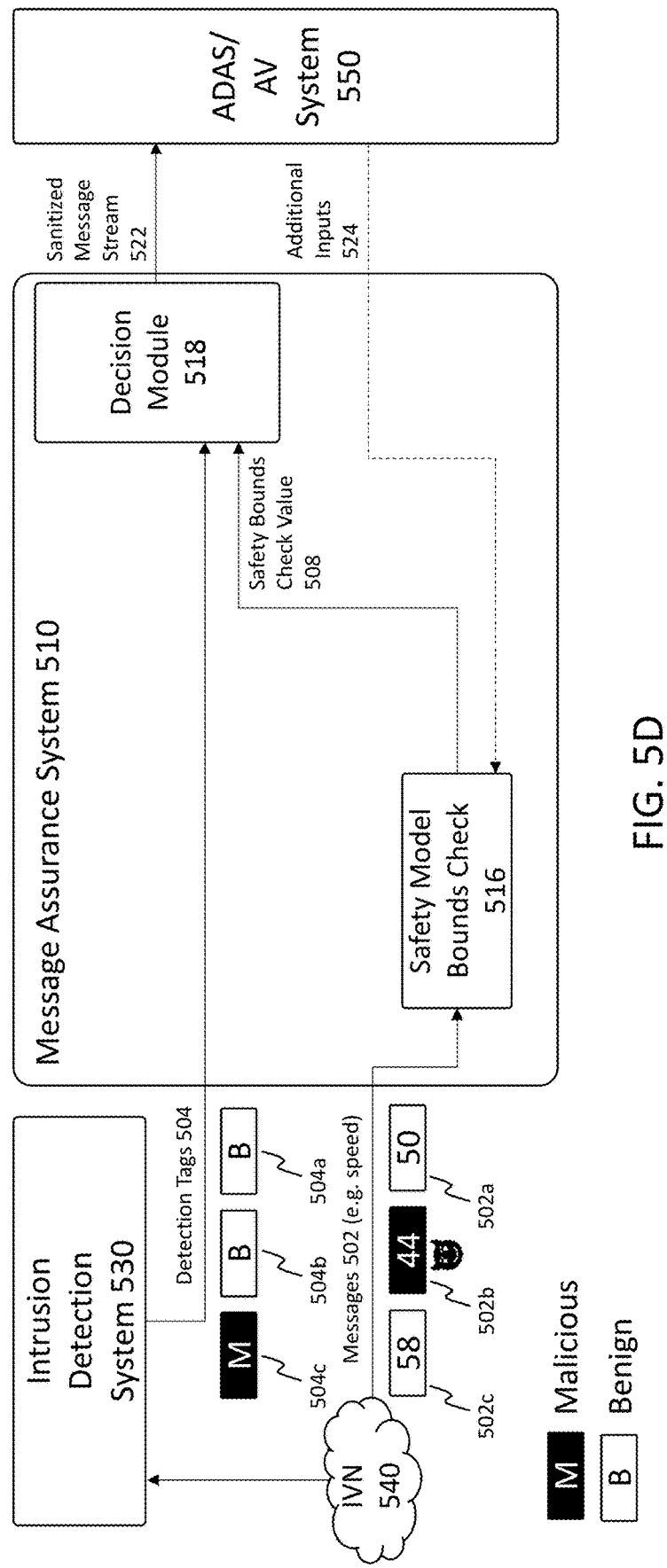

The MAS 510 may include any combination of the safety model bounds check module 516, the significance computation module 514, and the confidence computation module 512. In some examples, MAS 510 may only include one of the modules (e.g., the confidence value module 512 or the safety model bounds check module 516 (as shown in FIGS. 5C and 5D)). In some examples, the MAS 510 may include any two of the modules (e.g., the confidence computation module 512 and the significance computation module (as shown in FIG. 5B)). In some examples, MAS 510 may only include the safety model bounds check 516 and one of the confidence computation module 512 or the significance computation module 514.

The decision module 518 determines whether or not to allow a message to be used by one or more nodes of a vehicle control system. The determination may be based on the confidence value 506, significance value 507, and/or safety bounds check value 508. To enable interpretable decision making which is computationally tractable in real-time without additional resources, a decision tree based on a set of thresholds may be employed.

For example, the decision module 518 may receive a confidence tag or convert the received confidence value into a confidence tag. The confidence tag indicates either a high confidence in security classification of detection tag 504 associated with the present message 502 or a low confidence in the security classification of detection tag 504 associated with the present message 502. For example, the decision module 518 may compare the confidence value to a predetermined confidence threshold to determine whether the confidence value indicates a high confidence or a low confidence. The predetermined confidence threshold value may based on a risk policy and may be different based on the type of data contained in the message.

The decision module 518 may receive a significance tag or convert the received significance value into a significance tag. The significance tag indicates either a high significance of the present message 502 or a low significance of the present message 502. For example, the decision module 518 may compare the significance value to a predetermined significance threshold to determine whether the significance value indicates a high significance or a low significance. The predetermined significance threshold value may based on a risk policy and may be different based on the type of data contained in the message. The predetermined significance threshold value may dynamically change. For example, a minimum safety distance may change depending on the driving context. Accordingly, a significance threshold may depend on a distance between vehicles and present speed. In some instances, a significance threshold may be a function of distance (e.g., a percentage of the separation distance) and a factor of the speed.

The decision module 518 may receive a safety bounds check tag or convert the received safety bounds check value into a safety bounds check tag. The safety bounds check tag indicates either the measured value or a value derived from a progression of measure value is within predefined thresholds, i.e., PASS or beyond predefined thresholds, i.e., FAIL.

A set of one or more predetermined thresholds is determined based on the security and safety-based message assurance system and the safety driving model. Fixed thresholds or predetermined initial thresholds may be pre-loaded into each node of the automated vehicle control system. The initial thresholds may be dynamically updated locally at each node or dynamically updated centrally at a node and then distributed to the other nodes. In some instances, the set of thresholds may be dynamically determined by machine learning schemes or predefined equations. The set of thresholds may include different threshold values for different driving conditions or speeds.

In the following examples, the decision module may implement two layers of decision making, namely, an instant-based decision and a trend-based decision may be applied.

The instant-based decision making may be based on a current instantaneous confidence value or tag (security-based message characterization), significance value or tag (safety-based message characterization), and/or safety bounds check value or tag (safety-based message characterization).

FIG. 6A shows tables corresponding to an example decision tree implemented in decision module 518 of FIG. 5A. Referring to table 610 of FIG. 6B, entries 2, 3, 4, 7, and 8 indicate some situations when the decision module should not allow consumption of the message content since the message is tagged malicious and the confidence in the security classification is high or the significance is low. On the other hand, table entries 9, 11, and 15 indicate some situations when the decision module should allow consumption since the message is tagged benign and the confidence in the security classification is high or there would be no harm in consuming the message. In contrast, referring again to table 610, entries 1, 5, 6, 10, 12-14, and 16 indicate some indefinite situations when the decision module may need additional information to determine whether consumption of the message content should or should not be allowed. The unsure decisions (i.e., entries 5 and 13 of table 610), denoted as "?", are interesting since significance is high while confidence is low. On the other hand, the critical unsure decision (i.e., entries 1, 6, 10, 12, 14, and 16 of table 610), denoted as "?", presents more difficult uncertain situations. For example, referring to entry 1, high confidence in the malicious tag generally indicates that the message should be discarded. However, since significance is high and the value is within bounds in this situation, the decision is potentially critical.

FIG. 6B shows tables corresponding to example decision trees implemented in decision module 518 of FIG. 5B.

Referring to table 630 of FIG. 6B, entries 2, 4 and 8 indicate some situations when the decision module should not allow consumption of the message content since the significance is low, and the message is tagged as malicious with high confidence, malicious with low confidence, and benign with low confidence, respectively. On the other hand, table entries 5 and 6 indicate some situations when the decision module should allow consumption since confidence in the benign tag is high. In contrast, referring again to table 630, entries 1, 3 and 7 indicate some situations when the decision module may need additional information to determine whether consumption of the message content should or should not be allowed. The unsure decisions (i.e., entries 3 and 7 of table 630), denoted as "?", are interesting since significance is high while confidence is low. On the other hand, the critical unsure decision (i.e., entry 1 of table 630), denoted as "?", presents a more difficult situation because high confidence in the malicious tag generally indicates that the message should be discarded. However, since significance is high in this situation, the decision is potentially critical.

In the following, a subsequent trend-based decision making layer is presented which illustrates how past data may be used to potentially resolve the uncertainty associated with some situations. The trend-based decision may be helpful when there is a high significance value determined for the instant-based decision.

Since instant-based decision making may not suitably address all situations of determining whether to allow/block message consumption in all cases (as shown in the tables 610 and 630 in FIGS. 6A and 6B, respectively), an additional layer of decision making may be used. The additional layer of decision making is trend-based and requires maintaining a history of significance values or measurements (indicating the safety trend) for a sequential series of data samples or measurements extracted from messages. The second screening layer is only applied when the first screening layer is indeterminate. In a trend-based decision, the scaled significance values of messages are compared. A trend may be determined based on the two most recent significance values or may be determined based on a plurality of recent significance values.

For example, if in the instant-based decision, the situation of entries 5 or 13 of table 610 or entries 3 or 7 of the table 630 arises, then the trend-based decision shown in tables 630 and 640 may be employed. The trend-based decision may be dispositive when the significance trends downwards. In the case that significance values of a series of sample data has been decreasing (indicating that the distance to the safety envelope, although small, is increasing), the message can be discarded. Otherwise, the decision is still critically unsure. Critically unsure cases may be further handled based on adopted risk policies.

The trend-based decision making may be based on by taking current and prior significance values or tags (safety-based message characterization). For example, to determine a trend of the significance values of a particular series of data samples or sensor measurements, the number of significance values necessary to determine a reliable trend may be variable depending on the complexity of the significance assessments or measurements. At least two significance values are needed to determine if the significance values are trending upwards (increasing) or trending downwards (decreasing). However, two measurements could be susceptible to noise and not give a clear picture of the trend. Obtaining, storing, and using a several significance values associated with a chronological series of sampling data or sensor measurement values would make the trend more robust.

When the decision still cannot be resolved, the vehicle control system 1 would need to provide additional inputs or information 524 based on the ego vehicle's policies on how much risk to take or how conservative to be.

The tables illustrated in FIGS. 6A-6C are non-limiting examples. Application of a risk policy is not limited to uncertain situations. For example, referring to table 610, based on a more conservative risk policy, a decision for the situation of entry 15 may be to block the message because there is low confidence in the benign tag and low significance. The tables of FIGS. 6A-6C show the use of binary tags for the decision module. However, the decision module may include weighted equations and compute a decision based on the weight equations. The weights assigned to each of the confidence value, significance value, and/or safety bounds check value may be set based on a risk policy of the automated vehicle.

Any combination of the modules is a possible implementation of MAS control logic. FIG. 6C shows a table corresponding to an example decision tree implemented in decision module 518 of FIG. 5C. Referring to table 650 of FIG. 6C, for instance, if the significance computation module were not present, table 650 would have only four entries, and wherein according to entry 1, when there is high confidence of a malicious tag, the message is blocked/removed; according to entry 3, when there is high confidence of a benign tag, the message is allowed/passed; according to entry 2, where there is low confidence of a malicious tag, the message could be discarded depending on predetermined risk policies; and according to entry 4, where there is low confidence of a benign tag, the message could be consumed depending on predetermined risk policies.

FIG. 6D shows a table corresponding to an example decision tree implemented in decision module 518 of FIG. 5D. Referring to table 660 of FIG. 6D, for instance, when only the safety bounds check computation module is used, table 660 would have only four entries, and wherein according to entry 2, when there is a malicious tag and the bounds check failed, the message is blocked/removed; according to entry 3, when there is high confidence of a benign tag and the bounds check passed, the message is allowed/passed; according to entry 1, where there is a malicious tag but the bounds check passed, the message could be discarded or consumed depending on predetermined risk policies; and according to entry 4, where there is a benign tag and the bounds check failed, the message could be consumed or discarded depending on predetermined risk policies.

Figure 7A:
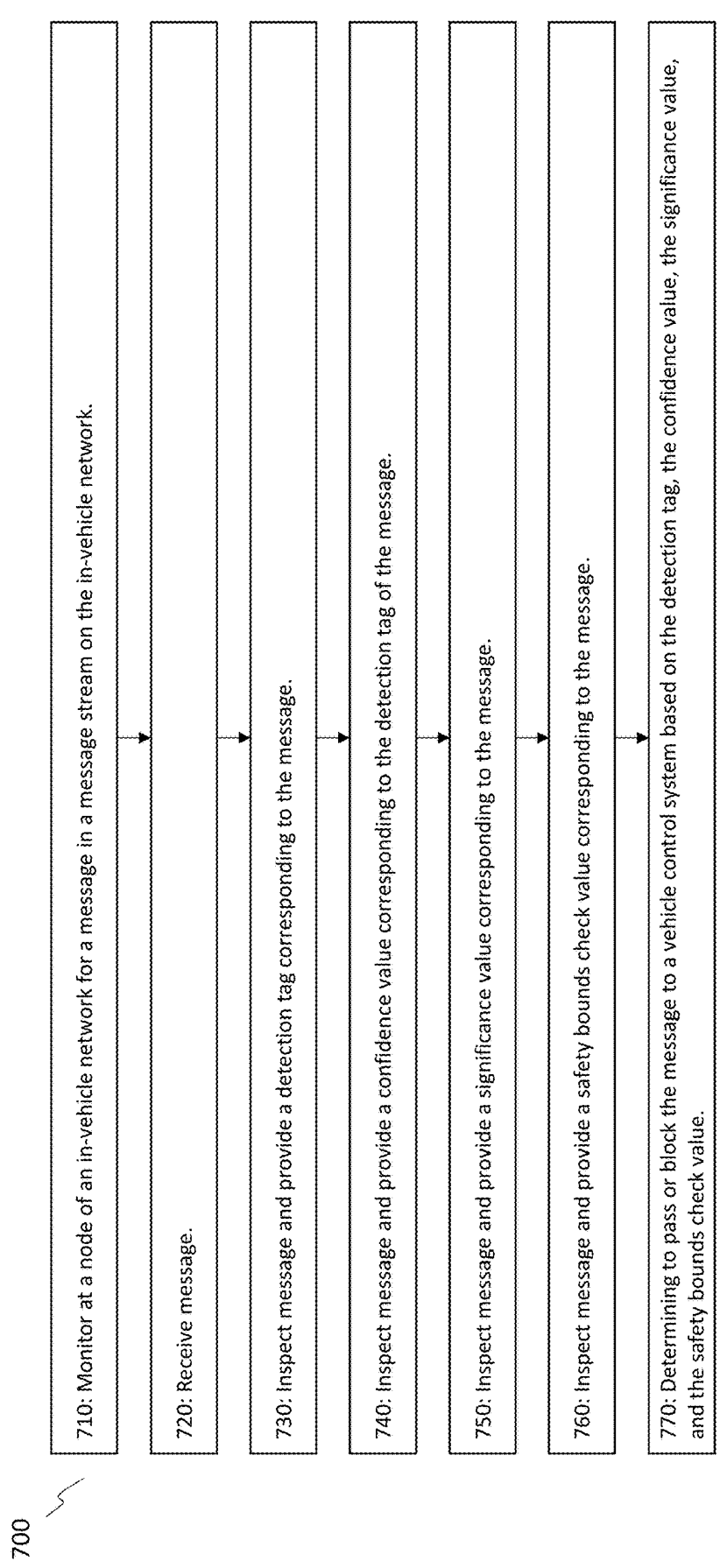
FIG. 7A shows an example of a logic flow that may be representative of operations that may be performed by the message assurance system of FIG. 5A in accordance with various aspects of the present disclosure.
Figure 7B:
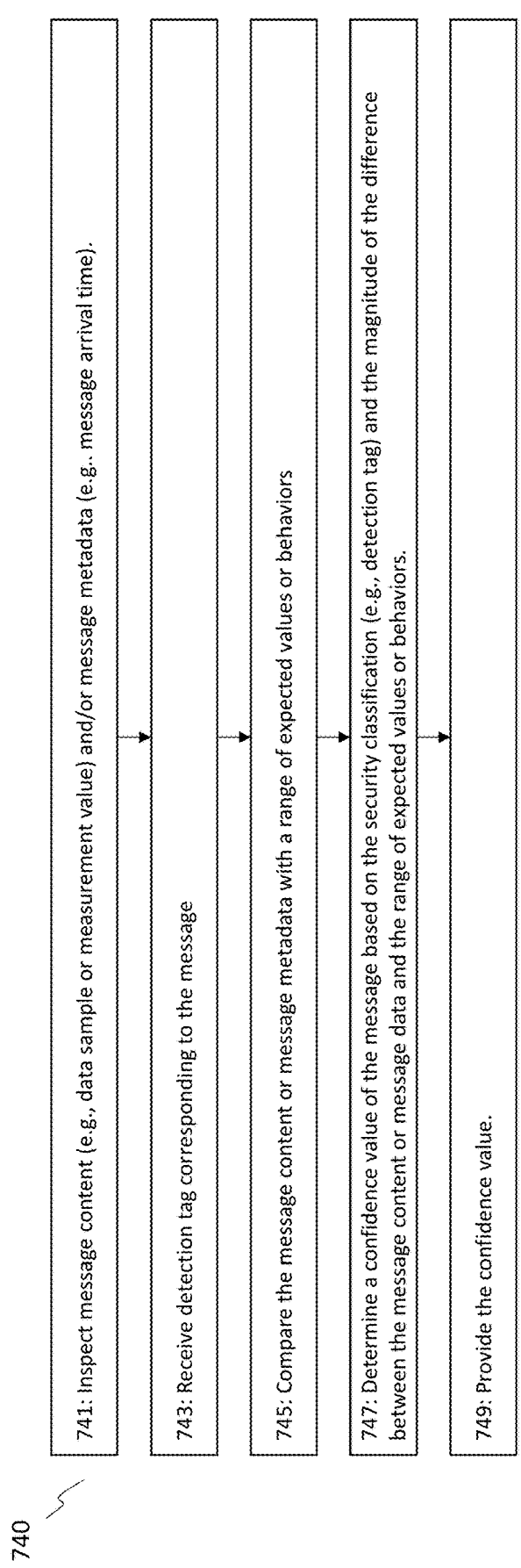
FIG. 7B shows an example of a logic flow that may be representative of operations that may be performed by the message assurance systems of FIGS. 5A-5C in accordance with various aspects of the present disclosure.
Figure 7C:
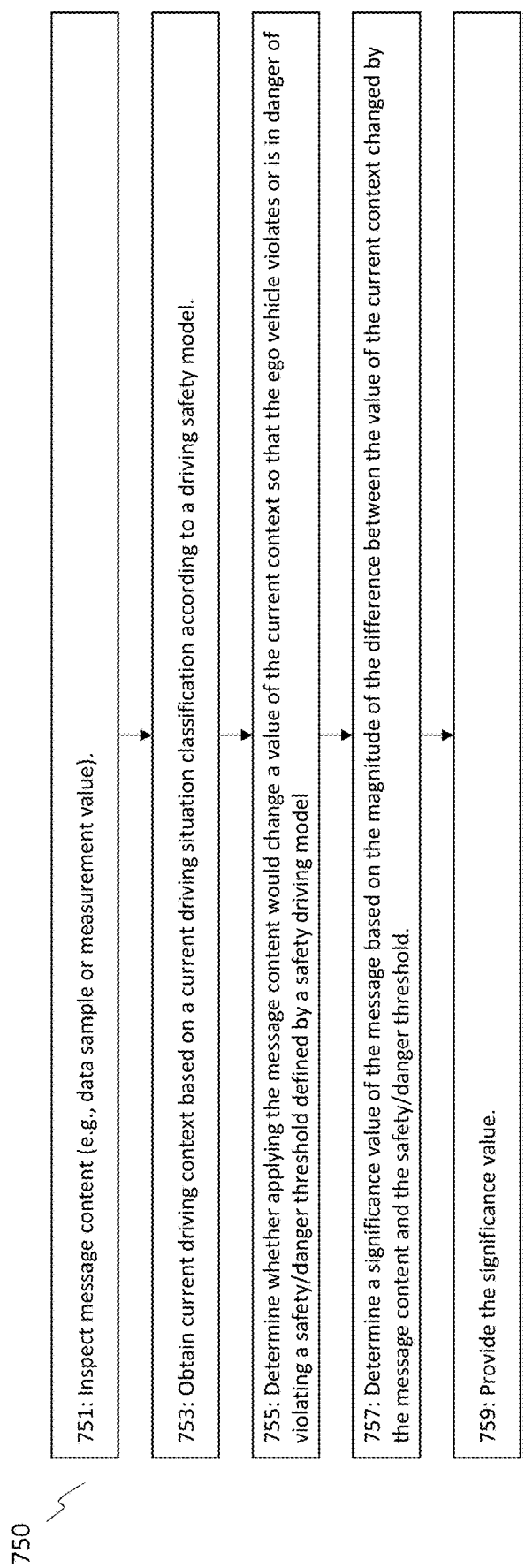
FIG. 7C shows an example of a logic flow that may be representative of operations that may be performed by the message assurance systems of FIGS. 5A-5B in accordance with various aspects of the present disclosure.
Figure 7D:
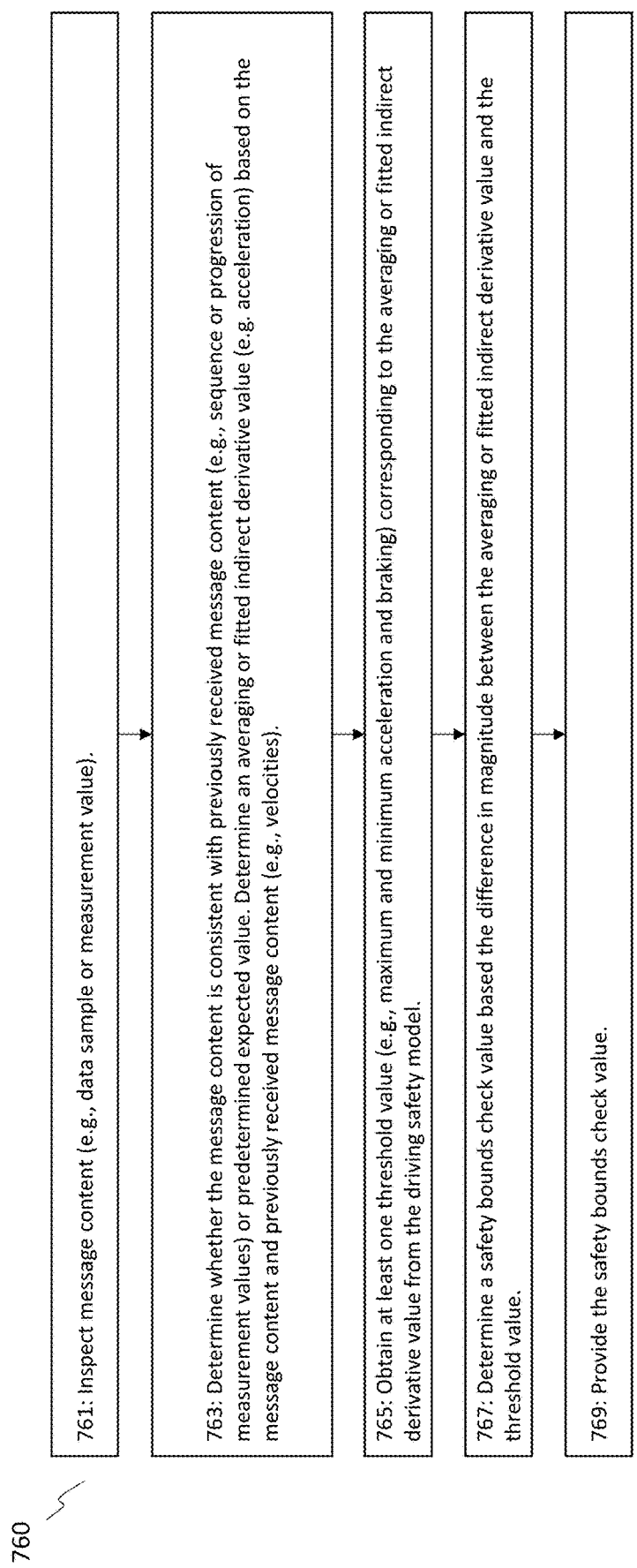
FIG. 7D shows an example of a logic flow that may be representative of operations that may be performed by the message assurance systems of FIGS. 5A and 5D in accordance with various aspects of the present disclosure.
Figure 7E:
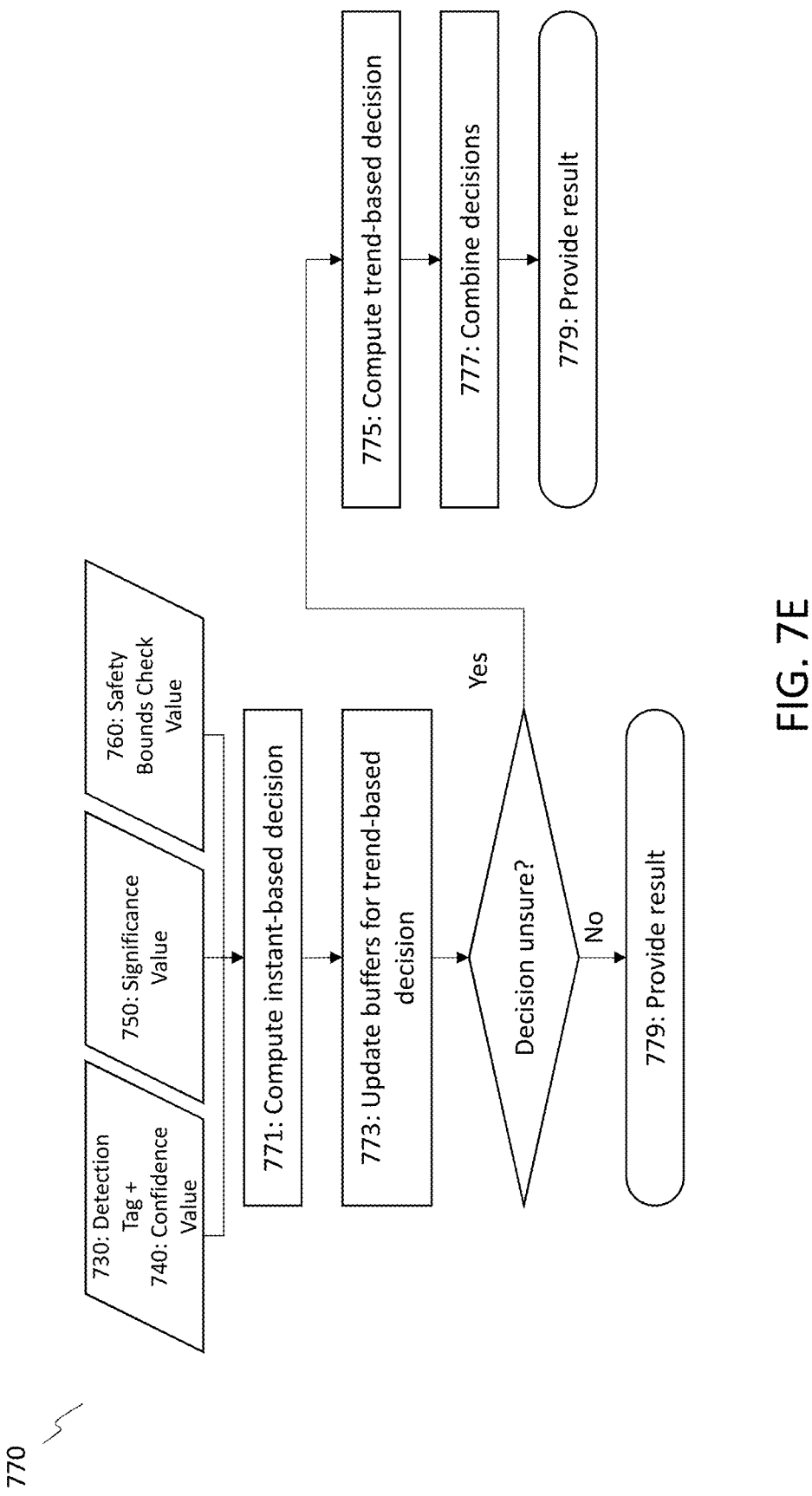
FIG. 7E shows an example of a logic flow that may be representative of operations that may be performed by the message assurance systems of FIG. 5A in accordance with various aspects of the present disclosure.

FIG. 7A shows an example of a logic flow that may be representative of operations that may be performed by the message assurance system of FIG. 5A in accordance with various aspects of the present disclosure. FIG. 7B shows an example of a logic flow that may be representative of operations that may be performed by the message assurance systems of FIGS. 5A-5C in accordance with various aspects of the present disclosure. FIG. 7C shows an example of a logic flow that may be representative of operations that may be performed by the message assurance systems of FIGS. 5A-5B in accordance with various aspects of the present disclosure. FIG. 7D shows an example of a logic flow that may be representative of operations that may be performed by the message assurance systems of FIGS. 5A and 5D in accordance with various aspects of the present disclosure. FIG. 7E shows an example of a logic flow that may be representative of operations that may be performed by the message assurance system of FIG. 5A in accordance with various aspects of the present disclosure.

Referring to FIG. 7A, at 710, a central node or each distributed node may monitor an in-vehicle network for a message in a message stream on the in-vehicle network. At 720, the node may receive the message. At 730, the node may inspect the message and provide a detection tag corresponding to the message or may receive a detection corresponding to the message. At 740, the node may inspect message and provide a confidence value corresponding to the detection tag of the message. At 750, the node may inspect message and provide a significance value corresponding to the message. At 760, the node may inspect message and provide a safety bounds check value corresponding to the message. At 770, the node may determine to pass or block the message to an higher layer control logic of a vehicle control system based on the detection tag, the confidence value, the significance value, and/or the safety bounds check value.

Referring to FIG. 7B, at 741, a node may inspect the message content (e.g., data sample or measurement value) and/or message metadata (e.g., message arrival time). At 743, the node may receive a detection tag corresponding to the message. At 745, the node may compare the message content or message metadata with a range of expected values or behaviors. At 747, the node may determine a confidence value of the message based on the security classification (e.g., detection tag) and the magnitude of the difference between the message content or message data and the range of expected values or behaviors. At 749, the node may provide the confidence value.

Referring to FIG. 7C, at 751, the node may inspect message content (e.g., data sample or measurement value). At 753, the node may obtain current driving context based on a current driving situation classification according to a driving safety model. At 755, the node may determine whether applying the message content would change a value of the current context so that the ego vehicle violates or is in danger of violating a safety/danger threshold defined by a safety driving model. At 757, the node may determine a significance value of the message based on the magnitude of the difference between the value of the current context changed by the message content and the safety/danger threshold. At 759, the node may provide the significance value.

Referring to FIG. 7D, at 761, the node may inspect message content (e.g., data sample or measurement value). At 763, the node may determine whether the message content is consistent with previously received message content (e.g., sequence or progression of measurement values) or predetermined expected value. Determine an averaging or fitted indirect derivative value (e.g. acceleration) based on the message content and previously received message content (e.g., velocities). At 765, the node may obtain at least one threshold value (e.g., maximum and minimum acceleration and braking) corresponding to the averaging or fitted indirect derivative value from the driving safety model. At 767, the node may determine a safety bounds check value based the difference in magnitude between the averaging or fitted indirect derivative value and the threshold value. At 769, the node may provide the safety bounds check value.

Referring to FIG. 7E, at 771, the node may compute an instant-based decision based on a significance value 507 or tag, a safety bounds check value 508 or tag, and/or a confidence value 506 or tag with a detection tag. At 773, the node may update memory or buffers for a trend-based decision. For example, the node may maintain several recent significance values associated with respective data samples/measurement values of one or more series of data samples/measurement values. At 775, the node may compute a trend-based decision based on the significance value associated with the content of the present message and the significance value associated with the content of at least one previously received message where the message content include data samples or measurement values of a series of data samples or measurement values. At 777, the node may combine the trend-based decision with an instant-based decision to determine a resultant decision. For example, referring to tables 620 and 640 of FIGS. 6A and 6B, respectively, when the instant-based confidence value is low and the trend-based significance value is decreasing, the resultant decision is to deny use of the message.

The security and safety-based message assurance system may be centralized or decentralized or a hybrid. The control logic of the message assurance system 510 may be implemented on the MCU of one dedicated node on the IVN or in the MCU of each node on the IVN.

FIG. 8A shows an exemplary dedicated centralized IDS/MAS node 880 for a VCS according to various aspects of the present disclosure. MAS 880 may include MCU 886, IDS 885, MAS 883, and interface 881. MAS 880 is coupled to IVN 5 and may inspect all messages on the IVN.

FIG. 8B shows an exemplary distributed IDS/MAS node 800 for a VCS according to various aspects of the present disclosure. ECU 800 may include MCU 806, IDS 805, MAS 803, interface 801, and an interactive module 809. In a system without a dedicated IDS, each node may also be configured to perform IDS. ECU 800 may be any node on the IVN. That is, each node may have a respective IDS 805 and MAS 803. The control logic for IDS 805 and MAS 803 may be implemented in the MCU 806 or in a separate logic circuit at the respective node. ECU 800 may only inspect the subset of messages on the in-vehicle network that is directed to or allegedly transmitted by ECU 800.

Figure 8C:
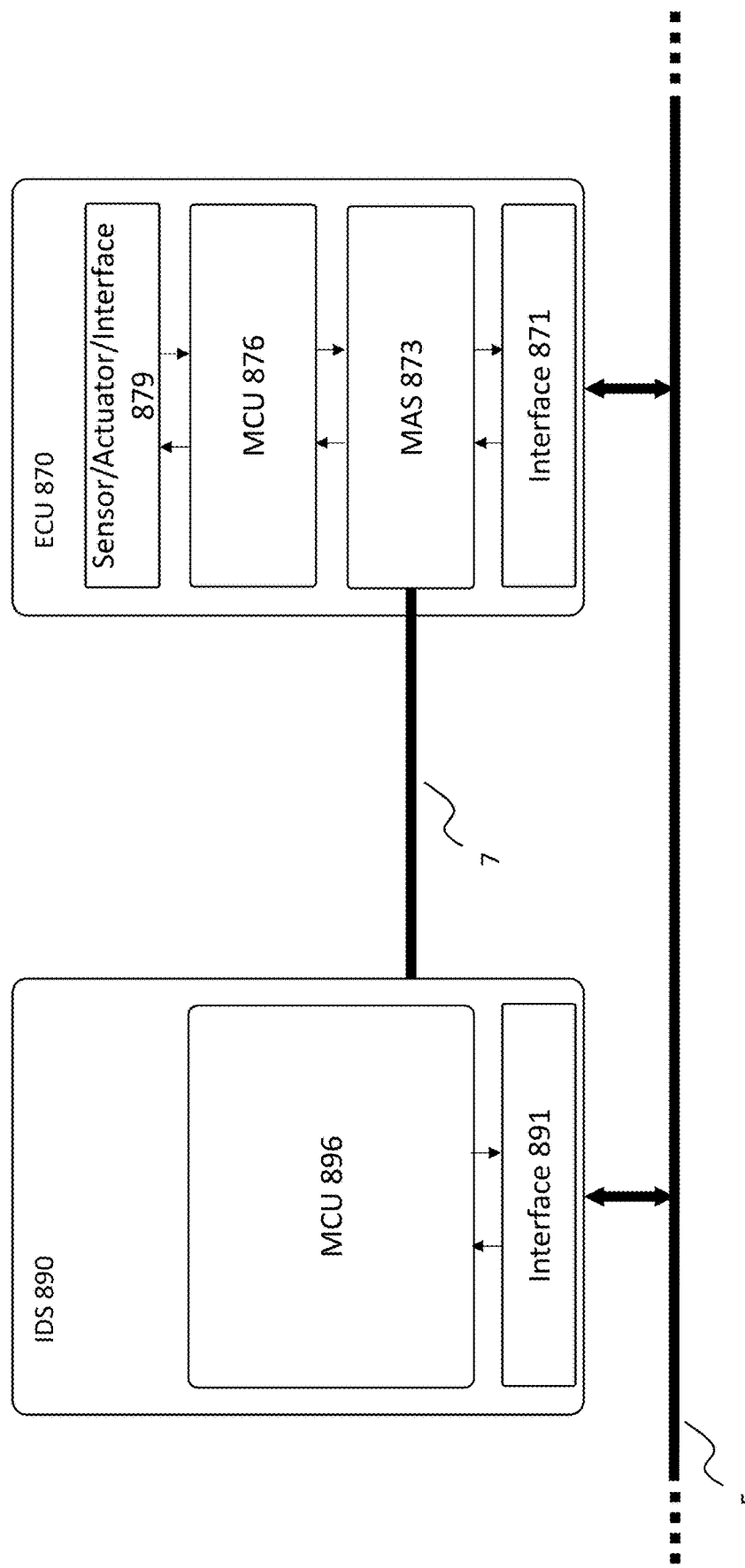
FIG. 8C shows an exemplary hybrid system including a dedicated IDS node and distributed MAS nodes for a VCS according to various aspects of the present disclosure.

FIG. 8C shows an exemplary hybrid system including a dedicated IDS node and distributed MAS nodes for a VCS according to various aspects of the present disclosure. IDS 890 may include MCU 896 and interface 891. IDS 890 is coupled to IVN 5 and inspects all messages on the IVN. ECU 870 may include MCU 876, MAS 873, interface 871, and an interactive module 879. IDS 890 may inspect all messages on the IVN and may provide security/detection tags to each ECU 870 via a secured communication channel 7.

The security and safety rules and values/thresholds may be defined in accordance to a security and safety model. The rules and associated values/thresholds may be fixed or dynamic. The formulas and values/thresholds may be pre-set at manufacture time, updated in the field, communicated dynamically through infrastructure, and/or derived (and/or adjusted) in the real world. In addition to driving scenarios, the thresholds can also be adjusted according to attack scenarios to make the system rules more restrictive or relaxed depending on the adversarial context. The updated threshold may be derived by each ECU locally or provided to ECUs via a secure channel.

The message assurance system may provide a security tag for each inspected message or sanitize the IVN by removing messages (or packages) deemed to be malicious from the IVN.

The control system 200 of an automated vehicle may include electronic control units (ECUs), sensors, and actuators disposed throughout the body of a vehicle. The ECUs, sensors, and actuators may be connected to an in-vehicle network that allows the ECUs, sensors, and actuators to communicate with each other. One ECU may use data from another ECU.

In the following, various aspects of the present disclosure will be illustrated:

Example 1 is a vehicle control system including an in-vehicle bus and a plurality of electronic control units (ECUs) coupled to the in-vehicle bus, wherein at least one ECU of the plurality of ECUs is configured to: receive, at a respective at least one ECU of the plurality of ECUs, a message in a message stream on the in-vehicle bus, evaluate the message to determine at least one of a confidence value of the security classification, a significance value of the message, or a bounds check value of the message, and determine in real-time to allow or deny the message to the vehicle control system based on at least one of the significance value of the message, the bounds check value of the message, or the confidence value of the security classification of the message, to provide a sanitized message stream to the vehicle control system.

In Example 2, the vehicle control system of Example 1 further includes wherein the at least one ECU of the plurality of ECUs is further configured to: inspect, at the respective at least one ECU, the message to determine the security classification of the message, or receive, at the respective at least one ECU, the security classification of the message.

In Example 3, the vehicle control system of Example 2, wherein a content of the message includes a data sample or measurement value.

In Example 4, the vehicle control system of Example 3, wherein the at least one ECU of the plurality of ECUs is further configured to: determine an instant-based decision to allow or deny the message to the vehicle control system based only on a significance value of the message, a bounds check value of the message, and/or a confidence value of the security classification of the message; update memory with the significance value of the message, the bounds check value of the message, and/or the confidence value of the security classification of the message; determine, when the instant-based decision is inconclusive, a trend-based decision based on at least two significance values, wherein the at least two significance values include the significance value of the message and a significance value of a prior message stored in memory, wherein contents of the message and the prior message correspond to a series of measured or sampled values; and determine in real-time to allow or deny the message to the vehicle control system based on a portion of the instant-based decision and the trend-based decision.

In Example 5, the vehicle control system of Example 4, wherein the portion of the instant-based decision is the confidence value and/or the bound check value.

In Example 6, the vehicle control system of Example 5, wherein the trend-based decision is determined only when the significance value associated with the instant-based decision is high.

In Example 7, the vehicle control system of Example 3, wherein the at least one ECU of the plurality of ECUs is further configured to: determine in real-time to allow or deny the message based on the security classification of the message and the confidence value of the security classification of the message.

In Example 8, the vehicle control system of Example 7, wherein the confidence value is determined based on the security classification and a characteristic of the message, wherein the characteristic of the message includes one of an arrival time of the message, a voltage of the message, or a content of the message.

In Example 9, the vehicle control system of Example 3, wherein the at least one ECU of the plurality of ECUs is further configured to: determine in real-time to allow or deny the message based on the significance value of the message, wherein the significance value of the message is based on the content of the message and a current driving context, wherein the current driving context is based on a current driving situation classification determined according to a driving safety model.

In Example 10, the vehicle control system of Example 9, wherein the at least one ECU of the plurality of ECUs is further configured to: determine the significance value based on whether using the content of the message changes the current driving situation classification according to the driving safety model or violates a rule associated with the current driving situation classification.

In Example 11, the vehicle control system of Example 10, wherein the significance value is proportional to the likelihood of a change in the current driving situation classification or a violation of the rule associated with the current driving situation.

In Example 12, the vehicle control system of Example 11, wherein determining the significance value further includes: determining a difference in magnitude between a value affected by the content of the message and a boundary threshold value associated with the current driving context.

In Example 13, the vehicle control system of Example 12, wherein the significance value is inversely proportional to the difference in magnitude.

In Example 14, the vehicle control system of Example 11, wherein the at least one ECU of the plurality of ECUs is further configured to: determine in real-time to allow or deny the message based on a plurality of significance values, wherein each significance value corresponds to a respective one of the messages in the message stream.

In Example 15, the vehicle control system of Example 14, wherein the at least one ECU of the plurality of ECUs is further configured to: receive, at the respective at least one ECU of the plurality of ECUs, a second message in the message stream, wherein the content of the message and a content of the second message correspond to sequential measurement values of a series of measurement values; evaluate the second message to determine a significance value of the second message; and determine in real-time to deny the second message when the significance value of the second message is lower than the significance value of the message.

In Example 16, the vehicle control system of Example 3, wherein the at least one ECU of the plurality of ECUs is further configured to: determine in real-time to allow or deny the message based on the safety bounds check value of the message, wherein the safety bounds check value of the message is determined based on a consistency among the content of the message and the contents of a plurality of previously received messages from the message stream, wherein the content of the message and the contents of the plurality of previously received messages correspond to sequential measurement values of a series of measurement values.

In Example 17, the vehicle control system of Example 16, wherein evaluating the content of the message to determine the safety bounds check value includes: determining whether the content of the message is consistent with the content of the plurality of previously received messages based on an indirect comparison of the content of the message and a predetermined safety threshold value based on the safety driving model.

In Example 18, The vehicle control system of Example 17, wherein determining the safety bounds check value further includes: determining an indirect value based on the content of the message and contents of the plurality of previously received messages, wherein the content of the message and the contents of the plurality of previously received messages correspond to a progression of measurement values; obtaining at least one predetermined safety threshold value corresponding to the indirect value; and determining a magnitude of a difference between the indirect value and the at least one predetermined safety threshold value.

In Example 19, the vehicle control system of Example 17, wherein determining the safety bounds check value further includes: performing a regression analysis to determine a derivative value of the content of the message and the contents of the plurality of previously received messages, wherein the content of the message and the contents of the plurality of previously received messages correspond to a progression of measurement values; determining at least one threshold value corresponding to the derivative value based on the safety driving model and a current driving context; and determining a magnitude of the difference between the derivative value and the at least one threshold value, wherein the safety bounds check value is proportional to the magnitude of said difference.

In Example 20, the vehicle control system of Example 3, wherein the at least one ECU of the plurality of ECUs is further configured to: determine in real-time to allow or deny the message based on the confidence value of the security classification of the message, the security classification of the message, and the significance value.

In Example 21, the vehicle control system of Example 20, wherein when the security classification is benign and the confidence value of the security classification is high the message is allowed, when the security classification is malicious and the significance value is low the message is denied, when the confidence value of the security classification is low and a significance value of a previously received message is higher than the significance value of the message the message is denied.

In Example 22, the vehicle control system of Example 3, wherein the at least one ECU of the plurality of ECUs is further configured to: determine in real-time to allow or deny the message based on the confidence value of the security classification of the message, the security classification of the message, the significance value, and the safety bounds check value.

In Example 23, the vehicle control system of Example 22, wherein the at least one ECU of the plurality of ECUs is further configured to: inspect, at the respective at least one ECU, the message to determine the security classification of the message, or receive, at the respective at least one ECU, the security classification of the message, wherein the content of the message includes a data sample or measurement value, wherein the confidence value is determined based on the security classification and a magnitude of the difference between the message content and at least one threshold value, wherein the significance value is determined based on whether using the content of the message changes the current driving situation classification according to the driving safety model or violates a rule associated with a current driving context, wherein the current driving context is based on a current driving situation classification determined according to a driving safety model, and wherein the safety bounds check value is determined based on a consistency among the content of the message and contents of a plurality of previously received messages from the message stream, wherein the content of the message and the contents of the plurality of previously received messages correspond to sequential measurement values of a series of measurement values.

Example 24 is at least one non-transitory computer-readable medium including a set of instructions that, in response to being executed at an electronic control unit (ECU) among a plurality of ECUs connected to an in-vehicle bus of a vehicle control system, cause the respective ECU to: receive, at the respective ECU of the plurality of ECUs, a message from a message stream on the in-vehicle bus; evaluate the message to determine at least one of a confidence value of a security classification, a significance value of the message, or a bounds check value of the message; and determine in real-time to allow or deny the message to the vehicle control system based on at least one of the significance value of the message, the bounds check value of the message, or the confidence value of the security classification of the message, to provide a sanitized message stream to the vehicle control system.

In Example 25, the at least one non-transitory computer-readable medium of Example 24, wherein the set of instructions include instructions that, in response to being executed at the respective ECU, cause the respective ECU to: inspect, at the respective ECU, the message to determine the security classification of the message, or receive, at the respective ECU, the security classification of the message.

In Example 26, the at least one non-transitory computer-readable medium of Example 25, wherein a content of the message includes a data sample or measurement value.

In Example 27, the at least one non-transitory computer-readable medium of Example 26, wherein the set of instructions include instructions that, in response to being executed at the respective ECU, cause the respective ECU to: determine an instant-based decision to allow or deny the message to the vehicle control system based only on a significance value of the message, a bounds check value of the message, and/or a confidence value of the security classification of the message; update memory with the significance value of the message, the bounds check value of the message, and/or the confidence value of the security classification of the message; determine, when the instant-based decision is inconclusive, a trend-based decision based on at least two significance values, wherein the at least two significance values include the significance value of the message and a significance value of a prior message stored in memory, wherein contents of the message and the prior message correspond to a series of measured or sampled values; and determine in real-time to allow or deny the message to the vehicle control system based on a portion of the instant-based decision and the trend-based decision.

In Example 28, the at least one non-transitory computer-readable medium of Example 27, wherein the portion of the instant-based decision is the confidence value and/or the bound check value.

In Example 29, the at least one non-transitory computer-readable medium of Example 27, wherein the trend-based decision is determined only when the significance value associated with the instant-based decision is high.

In Example 30, the at least one non-transitory computer-readable medium of Example 26, wherein the set of instructions include instructions that, in response to being executed at the respective ECU, cause the respective ECU to: determine in real-time to allow or deny the message based on the security classification of the message and the confidence value of the security classification of the message.

In Example 31, the at least one non-transitory computer-readable medium of Example 30, wherein the confidence value is determined based on the security classification and a characteristic of the message, wherein the characteristic of the message includes one of an arrival time of the message, a voltage of the message, or a content of the message.

In Example 32, the at least one non-transitory computer-readable medium of Example 26, wherein the set of instructions include instructions that, in response to being executed at the respective ECU, cause the respective ECU to: determine in real-time to allow or deny the message based on the significance value of the message, wherein the significance value of the message is based on the content of the message and a current driving context, wherein the current driving context is based on a current driving situation classification determined according to a driving safety model.

In Example 33, the at least one non-transitory computer-readable medium of Example 32, wherein the set of instructions include instructions that, in response to being executed at the respective ECU, cause the respective ECU to: determine the significance value based on whether using the content of the message changes the current driving situation classification according to the driving safety model or violates a rule associated with the current driving situation classification.

In Example 34, the at least one non-transitory computer-readable medium of Example 33, wherein the significance value is proportional to the likelihood of a change in the current driving situation classification or a violation of the rule associated with the current driving situation.

In Example 35, the at least one non-transitory computer-readable medium of Example 34, wherein determining the significance value further includes: determining a difference in magnitude between a value affected by the content of the message and a boundary threshold value associated with the current driving context.

In Example 36, the at least one non-transitory computer-readable medium of Example 35, wherein the significance value is inversely proportional to the difference in magnitude.

In Example 37, the at least one non-transitory computer-readable medium of Example 34, wherein the set of instructions include instructions that, in response to being executed at the respective ECU, cause the respective ECU to: determine in real-time to allow or deny the message based on a plurality of significance values, wherein each significance value corresponds to a respective one of the messages in the message stream.

In Example 38, the at least one non-transitory computer-readable medium of Example 37, wherein the set of instructions include instructions that, in response to being executed at the respective ECU, cause the respective ECU to: receive, at the respective ECU, a second message in the message stream, wherein the content of the message and a content of the second message correspond to sequential measurement values of a series of measurement values; evaluate the second message to determine a significance value of the second message; and determine in real-time to deny the second message when the significance value of the second message is lower than the significance value of the message.

In Example 39, the at least one non-transitory computer-readable medium of Example 26, wherein the set of instructions include instructions that, in response to being executed at the respective ECU, cause the respective ECU to: determine in real-time to allow or deny the message based on the safety bounds check value of the message, wherein the safety bounds check value of the message is determined based on a consistency among the content of the message and the contents of a plurality of previously received messages from the message stream, wherein the content of the message and the contents of the plurality of previously received messages correspond to sequential measurement values of a series of measurement values.

In Example 40, the at least one non-transitory computer-readable medium of Example 39, wherein evaluating the content of the message to determine the safety bounds check value includes: determining whether the content of the message is consistent with the content of the plurality of previously received messages based on an indirect comparison of the content of the message and a predetermined safety threshold value based on the safety driving model.

In Example 41, the at least one non-transitory computer-readable medium of Example 40, wherein determining the safety bounds check value further includes: determining an indirect value based on the content of the message and contents of the plurality of previously received messages, wherein the content of the message and the contents of the plurality of previously received messages correspond to a progression of measurement values; obtaining at least one predetermined safety threshold value corresponding to the indirect value; and determining a magnitude of a difference between the indirect value and the at least one predetermined safety threshold value.

In Example 42, the at least one non-transitory computer-readable medium of Example 40, wherein determining the safety bounds check value further includes: performing a regression analysis to determine a derivative value of the content of the message and the contents of the plurality of previously received messages, wherein the content of the message and the contents of the plurality of previously received messages correspond to a progression of measurement values; determining at least one threshold value corresponding to the derivative value based on the safety driving model and a current driving context; and determining a magnitude of the difference between the derivative value and the at least one threshold value, wherein the safety bounds check value is proportional to the magnitude of said difference.

In Example 43, the at least one non-transitory computer-readable medium of Example 26, wherein the set of instructions include instructions that, in response to being executed at the respective ECU, cause the respective ECU to: determine in real-time to allow or deny the message based on the confidence value of the security classification of the message, the security classification of the message, and the significance value.

In Example 44, the at least one non-transitory computer-readable medium of Example 43, wherein when the security classification is benign and the confidence value of the security classification is high the message is allowed, when the security classification is malicious and the significance value is low the message is denied, when the confidence value of the security classification is low and a significance value of a previously received message is higher than the significance value of the message the message is denied.

In Example 45, the at least one non-transitory computer-readable medium of Example 26, wherein the set of instructions include instructions that, in response to being executed at the respective ECU, cause the respective ECU to: determine in real-time to allow or deny the message based on the confidence value of the security classification of the message, the security classification of the message, the significance value, and the safety bounds check value.

In Example 46, the at least one non-transitory computer-readable medium of Example 45, wherein the set of instructions include instructions that, in response to being executed at the respective ECU, cause the respective ECU to: inspect, at the respective ECU, the message to determine the security classification of the message, or receive, at the respective ECU, the security classification of the message, wherein the content of the message includes a data sample or measurement value, wherein the confidence value is determined based on the security classification and a magnitude of the difference between the message content and at least one threshold value, wherein the significance value is determined based on whether using the content of the message changes the current driving situation classification according to the driving safety model or violates a rule associated with a current driving context, wherein the current driving context is based on a current driving situation classification determined according to a driving safety model, and wherein the safety bounds check value is determined based on a consistency among the content of the message and contents of a plurality of previously received messages from the message stream, wherein the content of the message and the contents of the plurality of previously received messages correspond to sequential measurement values of a series of measurement values.

Example 47 is a method for sanitizing a message stream communicated among a plurality of nodes connected to an in-vehicle bus of a vehicle control system, the method including: receiving, at a respective node of the plurality of nodes, a message from the message stream on the in-vehicle bus; evaluating the message to determine at least one of a confidence value of a security classification, a significance value of the message, or a bounds check value of the message; and determining in real-time to allow or deny the message to the vehicle control system based on at least one of the significance value of the message, the bounds check value of the message, or the confidence value of the security classification of the message, to provide a sanitized message stream to the vehicle control system.

In Example 48, the method of Example 47, further including: inspecting, at the respective node, the message to determine the security classification of the message, or receiving, at the respective node, the security classification of the message.

In Example 49, the method of Example 48, wherein a content of the message includes a data sample or measurement value.

In Example 50, the method of Example 49, further including: determining an instant-based decision to allow or deny the message to the vehicle control system based only on a significance value of the message, a bounds check value of the message, and/or a confidence value of the security classification of the message; updating memory with the significance value of the message, the bounds check value of the message, and/or the confidence value of the security classification of the message; determining, when the instant-based decision is inconclusive, a trend-based decision based on at least two significance values, wherein the at least two significance values include the significance value of the message and a significance value of a prior message stored in memory, wherein contents of the message and the prior message correspond to a series of measured or sampled values; and determining in real-time to allow or deny the message to the vehicle control system based on a portion of the instant-based decision and the trend-based decision.

In Example 51, the method of Example 50, wherein the portion of the instant-based decision is the confidence value and/or the bound check value.

In Example 52, the method of Example 51, wherein the trend-based decision is determined only when the significance value associated with the instant-based decision is high.

In Example 53, the method of Example 49, further including: determining in real-time to allow or deny the message based on the security classification of the message and the confidence value of the security classification of the message.

In Example 54, the method of Example 53, wherein the confidence value is determined based on the security classification and a characteristic of the message, wherein the characteristic of the message includes one of an arrival time of the message, a voltage of the message, or a content of the message.

In Example 55, the method of Example 49, further including: determining in real-time to allow or deny the message based on the significance value of the message, wherein the significance value of the message is based on the content of the message and a current driving context, wherein the current driving context is based on a current driving situation classification determined according to a driving safety model.

In Example 56, the method of Example 55, further including: determining the significance value based on whether using the content of the message changes the current driving situation classification according to the driving safety model or violates a rule associated with the current driving situation classification.

In Example 57, the method of Example 56, wherein the significance value is proportional to the likelihood of a change in the current driving situation classification or a violation of the rule associated with the current driving situation.

In Example 58, the method of Example 57, wherein determining the significance value further includes: determining a difference in magnitude between a value affected by the content of the message and a boundary threshold value associated with the current driving context.

In Example 59, the method of Example 58, wherein the significance value is inversely proportional to the difference in magnitude.

In Example 60, the method of Example 57, further including: determining in real-time to allow or deny the message based on a plurality of significance values, wherein each significance value corresponds to a respective one of the messages in the message stream.

In Example 61, the method of Example 60, further including: receiving, at the respective node of the plurality of nodes, for a second message in the message stream, wherein the content of the message and a content of the second message correspond to sequential measurement values of a series of measurement values; evaluating the second message to determine a significance value of the second message; and determining in real-time to deny the second message when the significance value of the second message is lower than the significance value of the message.

In Example 62, the method of Example 26, further including: determining in real-time to allow or deny the message based on the safety bounds check value of the message, wherein the safety bounds check value of the message is determined based on a consistency among the content of the message and the contents of a plurality of previously received messages from the message stream, wherein the content of the message and the contents of the plurality of previously received messages correspond to sequential measurement values of a series of measurement values.

In Example 64, the method of Example 62, wherein evaluating the content of the message to determine the safety bounds check value includes: determining whether the content of the message is consistent with the content of the plurality of previously received messages based on an indirect comparison of the content of the message and a predetermined safety threshold value based on the safety driving model.

In Example 65, the method of Example 64, wherein determining the safety bounds check value further includes: determining an indirect value based on the content of the message and contents of the plurality of previously received messages, wherein the content of the message and the contents of the plurality of previously received messages correspond to a progression of measurement values; obtaining at least one predetermined safety threshold value corresponding to the indirect value; and determining a magnitude of a difference between the indirect value and the at least one predetermined safety threshold value.

In Example 66, the method of Example 64, wherein determining the safety bounds check value further includes: performing a regression analysis to determine a derivative value of the content of the message and the contents of the plurality of previously received messages, wherein the content of the message and the contents of the plurality of previously received messages correspond to a progression of measurement values; determining at least one threshold value corresponding to the derivative value based on the safety driving model and a current driving context; and determining a magnitude of the difference between the derivative value and the at least one threshold value, wherein the safety bounds check value is proportional to the magnitude of said difference.

In Example 67, the method of Example 49, further including: determining in real-time to allow or deny the message based on the confidence value of the security classification of the message, the security classification of the message, and the significance value.

In Example 68, the method of Example 67, wherein when the security classification is benign and the confidence value of the security classification is high the message is allowed, when the security classification is malicious and the significance value is low the message is denied, when the confidence value of the security classification is low and a significance value of a previously received message is higher than the significance value of the message the message is denied.

In Example 69, the method of Example 49, further including: determining in real-time to allow or deny the message based on the confidence value of the security classification of the message, the security classification of the message, the significance value, and the safety bounds check value.

In Example 70, the method of Example 69, further including: inspecting, at the respective node, the message to determine the security classification of the message, or receiving, at the respective node, the security classification of the message, wherein the content of the message includes a data sample or measurement value, wherein the confidence value is determined based on the security classification and a magnitude of the difference between the message content and at least one threshold value, wherein the significance value is determined based on whether using the content of the message changes the current driving situation classification according to the driving safety model or violates a rule associated with a current driving context, wherein the current driving context is based on a current driving situation classification determined according to a driving safety model, and wherein the safety bounds check value is determined based on a consistency among the content of the message and contents of a plurality of previously received messages from the message stream, wherein the content of the message and the contents of the plurality of previously received messages correspond to sequential measurement values of a series of measurement values.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A vehicle control system, the vehicle control system comprising:
   an in-vehicle bus;
   a plurality of electronic control units (ECUs) coupled to the in-vehicle bus, wherein at least one ECU of the plurality of ECUs is configured to:
     receive, at a respective at least one ECU of the plurality of ECUs, a message in a message stream on the in-vehicle bus, wherein a content of the message includes a data sample or measurement value;
     inspect, at the respective at least one ECU, the message to determine a security classification of the message, or receive, at the respective at least one ECU, the security classification of the message;
     evaluate the message to determine at least one of a confidence value of the security classification, a significance value of the message, or a bounds check value of the message; and
     determine in real-time to allow or deny the message to the vehicle control system based on at least one of the significance value of the message, the bounds check value of the message, or the confidence value of the security classification of the message, to provide a sanitized message stream to the vehicle control system, wherein the at least one of the ECU configured to determine in real-time to allow or deny the message to the vehicle control system is further configured to:

determine an instant-based decision to allow or deny the message to the vehicle control system based only on the significance value of the message, the bounds check value of the message, and/or the confidence value of the security classification of the message;

update memory with the significance value of the message, the bounds check value of the message, and/or the confidence value of the security classification of the message;

determine, when the instant-based decision is inconclusive, a trend-based decision based on at least two significance values, wherein the at least two significance values include the significance value of the message and a significance value of a prior message stored in memory, wherein contents of the message and the prior message correspond to a series of measured or sampled values; and determine in real-time to allow or deny the message to the vehicle control system based on a portion of the instant-based decision and the trend-based decision.

2. The vehicle control system of claim 1, wherein the portion of the instant-based decision is based on the confidence value and/or the bound check value.

3. The vehicle control system of claim 1, wherein the portion of the instant-based decision is based on the security classification of the message and the confidence value of the security classification of the message.

4. The vehicle control system of claim 3, wherein the confidence value is determined based on the security classification and a characteristic of the message, wherein the characteristic of the message includes one of an arrival time of the message, a voltage of the message, or a content of the message.

5. The vehicle control system of claim 1, wherein the portion of the instant-based decision is based on the bounds check value of the message, wherein the bounds check value of the message is determined based on a consistency among the content of the message and the contents of a plurality of previously received messages from the message stream, wherein the content of the message and the contents of the plurality of previously received messages correspond to sequential measurement values of a series of measurement values.

6. The vehicle control system of claim 5, wherein evaluating the content of the message to determine the bounds check value comprises:

determining whether the content of the message is consistent with the content of the plurality of previously received messages based on an indirect comparison of the content of the message and a predetermined safety threshold value based on the safety driving model.

7. The vehicle control system of claim 6, wherein determining the bounds check value further comprises:

determining an indirect value based on the content of the message and contents of the plurality of previously received messages, wherein the content of the message and the contents of the plurality of previously received messages correspond to a progression of measurement values;

obtaining at least one predetermined safety threshold value corresponding to the indirect value; and determining a magnitude of a difference between the indirect value and the at least one predetermined safety threshold value.

8. The vehicle control system of claim 6, wherein determining the bounds check value further comprises:

performing a regression analysis to determine a derivative value of the content of the message and the contents of the plurality of previously received messages, wherein the content of the message and the contents of the plurality of previously received messages correspond to a progression of measurement values;

determining at least one threshold value corresponding to the derivative value based on the safety driving model and a current driving context; and determining a magnitude of the difference between the derivative value and the at least one threshold value, wherein the bounds check value is proportional to the magnitude of said difference.

9. The vehicle control system of claim 1, wherein the portion of the instant-based decision is based on the confidence value of the security classification of the message, the security classification of the message, and the significance value.

10. The vehicle control system of claim 1, wherein the portion of the instant-based decision is based on the significance value of the message, wherein the significance value of the message is based on the content of the message and a current driving context, wherein the current driving context is based on a current driving situation classification determined according to a driving safety model.

11. A vehicle control system, the vehicle control system comprising:

an in-vehicle bus;

a plurality of electronic control units (ECUs) coupled to the in-vehicle bus, wherein at least one ECU of the plurality of ECUs is configured to:

receive, at a respective at least one ECU of the plurality of ECUs, a message in a message stream on the in-vehicle bus, wherein a content of the message includes a data sample or measurement value;

inspect, at the respective at least one ECU, the message to determine a security classification of the message, or receive, at the respective at least one ECU, the security classification of the message;

evaluate the message to determine at least one of a confidence value of the security classification, a significance value of the message, or a bounds check value of the message; and determine in real-time to allow or deny the message based on the significance value of the message, wherein the significance value of the message is based on the content of the message and a current driving context, wherein the current driving context is based on a current driving situation classification determined according to a driving safety model, wherein the significance value is determined based on whether using the content of the message changes the current driving situation classification according to the driving safety model or violates a rule associated with the current driving situation classification.

12. The vehicle control system of claim 11, wherein the significance value is proportional to the likelihood of a change in the current driving situation classification or a violation of the rule associated with the current driving situation.

13. The vehicle control system of claim 12, wherein the at least one ECU of the plurality of ECUs is further configured to:

determine in real-time to allow or deny the message based on a plurality of significance values, wherein each significance value corresponds to a respective one of the messages in the message stream.

14. The vehicle control system of claim 13, wherein the at least one ECU of the plurality of ECUs is further configured to:
receive, at the respective at least one ECU of the plurality of ECUs, a second message in the message stream, wherein the content of the message and a content of the second message correspond to sequential measurement values of a series of measurement values;
evaluate the second message to determine a significance value of the second message; and
determine in real-time to deny the second message when the significance value of the second message is lower than the significance value of the message.

15. The vehicle control system of claim 11, wherein the at least one ECU of the plurality of ECUs is further configured to:
determine in real-time to allow or deny the message based on the confidence value and/or the bound check value.

16. The vehicle control system of claim 11, wherein the at least one ECU of the plurality of ECUs is further configured to:
determine in real-time to allow or deny the message based on the security classification of the message and the confidence value of the security classification of the message.

17. The vehicle control system of claim 11, wherein the at least one ECU of the plurality of ECUs is further configured to:
determine in real-time to allow or deny the message based on the bounds check value of the message, wherein the bounds check value of the message is determined based on a consistency among the content of the message and the contents of a plurality of previously received messages from the message stream, wherein the content of the message and the contents of the plurality of previously received messages correspond to sequential measurement values of a series of measurement values.

18. The vehicle control system of claim 11, wherein the at least one ECU of the plurality of ECUs is further configured to:
determine in real-time to allow or deny the message based on the confidence value of the security classification of the message, the security classification of the message, and the significance value.

19. A vehicle control system, the vehicle control system comprising:
an in-vehicle bus;
a plurality of electronic control units (ECUs) coupled to the in-vehicle bus, wherein at least one ECU of the plurality of ECUs is configured to:
receive, at a respective at least one ECU of the plurality of ECUs, a message in a message stream on the in-vehicle bus;
inspect, at the respective at least one ECU, the message to determine a security classification of the message, or receive, at the respective at least one ECU, the security classification of the message,
evaluate the message to determine a confidence value of the security classification, a significance value of the message, and a bounds check value of the message; and
determine in real-time to allow or deny the message to the vehicle control system based on the security classification of the message, the confidence value of the security classification of the message, the significance value of the message, and the bounds check value of the message, to provide a sanitized message stream to the vehicle control system,
wherein the content of the message includes a data sample or measurement value,
wherein the confidence value is determined based on the security classification and a magnitude of the difference between the message content and at least one threshold value,
wherein the significance value is determined based on whether using the content of the message changes a current driving situation classification according to a driving safety model or violates a rule associated with a current driving context, wherein the current driving context is based on the current driving situation classification determined according to the driving safety model, and
wherein the bounds check value is determined based on a consistency among the content of the message and contents of a plurality of previously received messages from the message stream, wherein the content of the message and the contents of the plurality of previously received messages correspond to sequential measurement values of a series of measurement values.

* * * * *